(12) United States Patent  
Miyamoto et al.

(10) Patent No.: US 11,520,267 B2  
(45) Date of Patent: Dec. 6, 2022

(54) IMAGE PROCESSING METHOD, IMAGE PROCESSING APPARATUS

(71) Applicant: KYOCERA Document Solutions Inc., Osaka (JP)

(72) Inventors: Takuya Miyamoto, Osaka (JP); Kazunori Tanaka, Osaka (JP); Kanako Morimoto, Osaka (JP); Koji Sato, Osaka (JP); Rui Hamabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/558,505

(22) Filed: Dec. 21, 2021

(65) Prior Publication Data

US 2022/0206425 A1   Jun. 30, 2022

(30) Foreign Application Priority Data

Dec. 24, 2020   (JP) .............................. JP2020-214839

(51) Int. Cl.
   *G03G 15/00*   (2006.01)
(52) U.S. Cl.
   CPC ..... *G03G 15/5062* (2013.01); *G03G 15/5041* (2013.01); *G03G 15/55* (2013.01)
(58) Field of Classification Search
   CPC ........... G03G 15/5041; G03G 15/5054; G03G 15/5062; G03G 15/55
   See application file for complete search history.

(56) References Cited

U.S. PATENT DOCUMENTS

2022/0206424 A1*   6/2022   Tanaka ............... H04N 1/00076
2022/0206425 A1*   6/2022   Miyamoto ............... H04N 1/58

FOREIGN PATENT DOCUMENTS

JP   2017083544 A   5/2017

* cited by examiner

*Primary Examiner* — Hoang X Ngo
(74) *Attorney, Agent, or Firm* — Alleman Hall Creasman & Tuttle LLP

(57) ABSTRACT

A processor generates an extraction image by extracting, from a test image, a target specific part that is a horizontal stripe extending in a horizontal direction or a noise point. The processor derives a vertical data sequence from a target area in the extraction image and converts the vertical data sequence to primary conversion data of a frequency domain. The processor converts, to secondary conversion data of a space domain, correction data that is obtained by removing, from the primary conversion data, data of frequency bands other than a particular frequency band corresponding to a target specific part that was determined as having periodicities. The processor classifies the target specific parts into periodic specific part and non-periodic specific part by comparing positions of the target specific parts with a peak position in a waveform represented by the secondary conversion data.

6 Claims, 9 Drawing Sheets

IMAGE PROCESSING METHOD, IMAGE PROCESSING APPARATUS

INCORPORATION BY REFERENCE

This application is based upon and claims the benefit of priority from the corresponding Japanese Patent Application No. 2020-214839 filed on Dec. 24, 2020, the entire contents of which are incorporated herein by reference.

BACKGROUND

The present disclosure relates to an image processing method and an image processing apparatus for determining a state of an image defect based on a test image.

An image forming apparatus such as a printer or a multifunction peripheral executes a print process to form an image on a sheet. In the print process, an image defect such as a vertical stripe, a horizontal stripe, or a noise point may be generated on the image formed on an output sheet.

For example, in a case where the image forming apparatus executes the print process by an electrophotographic method, the image defect may be caused by any of various parts such as a photoconductor, a charging portion, a developing portion, and a transfer portion. In addition, it requires skill to determine the cause of the image defect.

In addition, there is known an image processing apparatus that preliminarily stores, as table data, correspondence between: phenomena that cause the vertical stripe as an example of the image defect; and feature information such as the color of the vertical stripe, density, and the number of screen lines, wherein a phenomenon that has caused the vertical stripe is identified based on information of the color of an image of the vertical stripe, density, or the number of screen lines in a test image and the table data.

In the table data, the range of a parameter, such as the color of the image, density, or the number of screen lines, is set by thresholds for each type of phenomenon that may cause the vertical stripe.

SUMMARY

In an image processing method according to an aspect of the present disclosure, a processor determines a state of an image defect based on a test image that is obtained through an image reading process performed on an output sheet output from an image forming device. The image processing method includes the processor generating an extraction image by extracting, from the test image, a target specific part that is a horizontal stripe extending in a horizontal direction or a noise point. Furthermore, the image processing method includes the processor deriving, from a target area in the extraction image in which three or more target specific parts are lined up in a vertical direction, a vertical data sequence composed of each representative value of a plurality of pixel values of each line extending in the horizontal direction in the target area. Furthermore, the image processing method includes the processor converting the vertical data sequence to primary conversion data of a frequency domain. Furthermore, the image processing method includes the processor determining whether or not the target specific parts have one or more predetermined periodicities in the vertical direction, based on the primary conversion data. Furthermore, the image processing method includes the processor converting, to secondary conversion data of a space domain, correction data that is obtained by removing, from the primary conversion data, data of frequency bands other than a particular frequency band corresponding to a target specific part that was determined as having the periodicities. Furthermore, the image processing method includes the processor classifying the target specific parts included in the target area into periodic specific part and non-periodic specific part by comparing positions of the target specific parts in the target area with a peak position in a waveform represented by the secondary conversion data, the periodic specific part corresponding to the periodicities, the non-periodic specific part being specific part other than the periodic specific part.

An image processing apparatus according to another aspect of the present disclosure includes the processor that executes processes of the image processing method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Processing Apparatus 10]

An image processing apparatus 10 according to an embodiment includes an image forming device 2 that executes a print process. In the print process, an image is formed on a sheet. The sheet is an image formation medium such as a sheet of paper or a sheet-like resin material.

Furthermore, the image processing apparatus 10 includes an image reading device 1 that executes a reading process to read an image from a document sheet. For example, the image processing apparatus 10 is a copier, a facsimile apparatus, or a multifunction peripheral.

The image targeted to be processed in the print process is, for example, an image read from the document sheet by the image reading device 1 or an image represented by print data received from a host apparatus (not shown). The host apparatus is an information processing apparatus such as a personal computer or a mobile information terminal.

Figure 5:
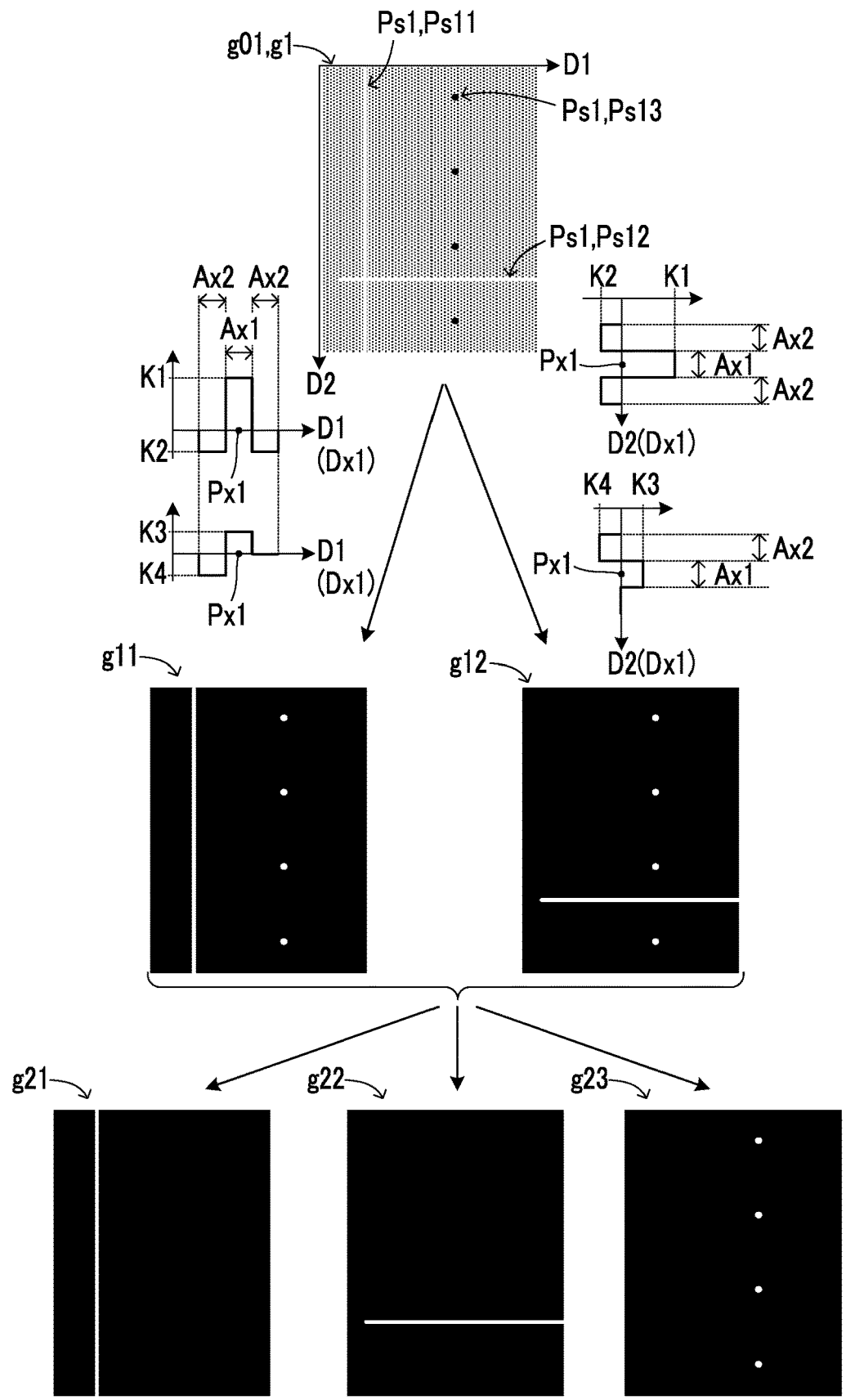
FIG. 5 is a diagram showing an example of a test image including specific parts and examples of pre-process images and feature images generated based on the test image.

Furthermore, in the print process, the image forming device 2 may form a predetermined original test image g01 on a sheet (see FIG. 5). The original test image g01 is an original of a test image g1 that is used to determine whether or not an image defect has been generated by the image forming device 2 and to determine the cause of the image defect (see FIG. 5). The test image g1 is described below.

A copy process includes: the reading process performed by the image reading device 1; and the print process performed by the image forming device 2 based on an image obtained in the reading process.

Figure 1:
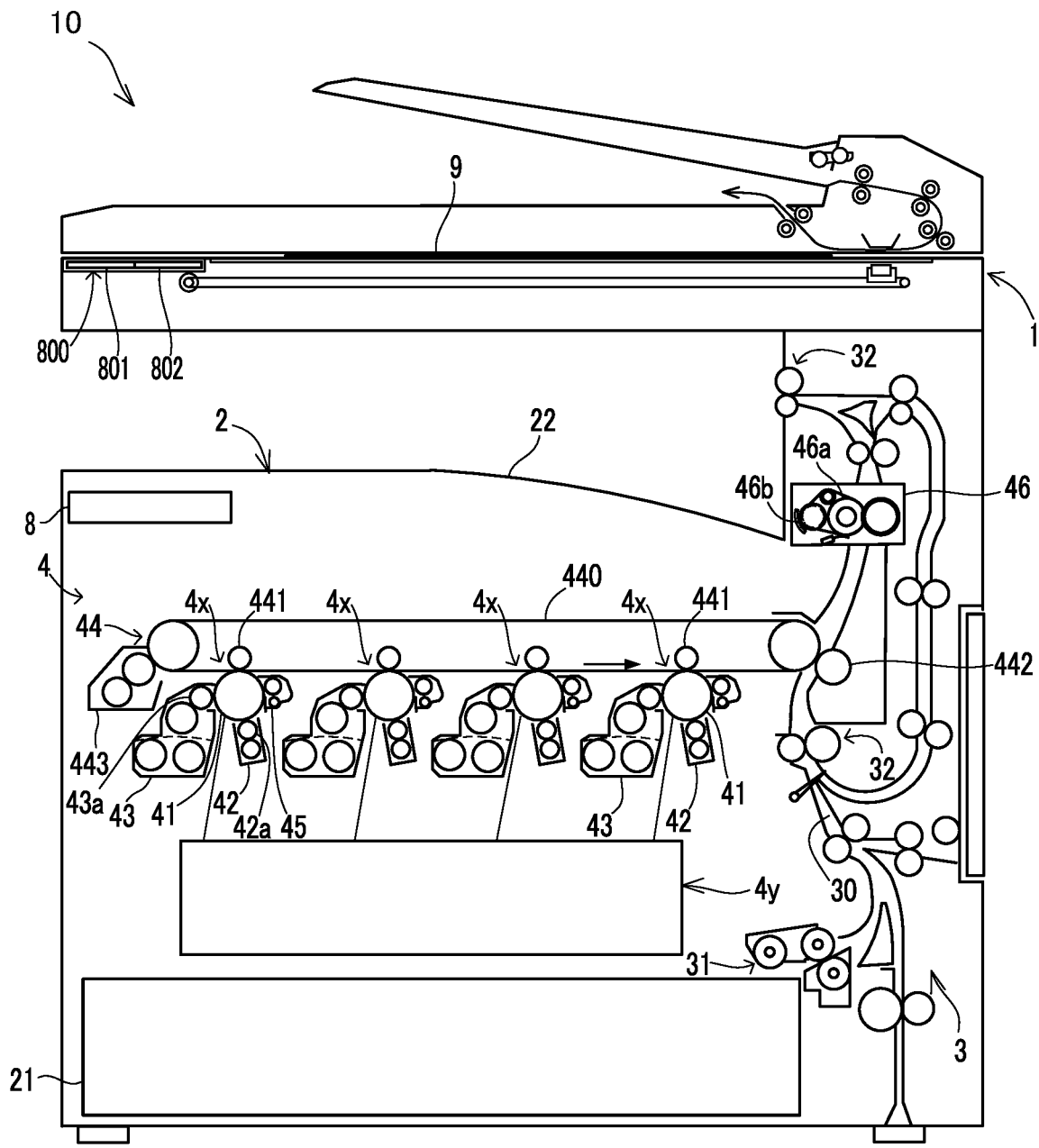
FIG. 1 is a configuration diagram of an image processing apparatus according to an embodiment.

As shown in FIG. 1, the image forming device 2 includes a sheet conveying mechanism 3 and a print portion 4. The sheet conveying mechanism 3 includes a sheet feed-out mechanism 31 and a plurality of pairs of sheet conveying rollers 32.

The sheet feed-out mechanism 31 feeds out a sheet from a sheet storage portion 21 to a sheet conveyance path 30. The plurality of pairs of sheet conveying rollers 32 convey the sheet along the sheet conveyance path 30, and discharge the sheet with an image formed thereon to a discharge tray 22.

The print portion 4 executes the print process on the sheet conveyed by the sheet conveying mechanism 3. In the present embodiment, the print portion 4 executes the print process by an electrophotographic method.

The print portion 4 includes an image creating portion 4x, a laser scanning unit 4y, a transfer device 44, and a fixing device 46. The image creating portion 4x includes a drum-like photoconductor 41, a charging device 42, a developing device 43, and a drum cleaning device 45.

The photoconductor 41 rotates, and the charging device 42 electrically charges the surface of the photoconductor 41 uniformly. The charging device 42 includes a charging roller 42a that rotates while in contact with the surface of the photoconductor 41. The charging roller 42a to which a charging voltage has been applied, electrically charges the surface of the photoconductor 41.

The laser scanning unit 4y writes an electrostatic latent image on the charged surface of the photoconductor 41 by scanning a laser light. This allows the electrostatic latent image to be formed on the surface of the photoconductor 41.

The developing device 43 develops the electrostatic latent image as a toner image. The developing device 43 includes a developing roller 43a that develops the electrostatic latent image as the toner image by supplying the toner to the photoconductor 41. The transfer device 44 transfers the toner image from the surface of the photoconductor 41 to the sheet. It is noted that the toner is an example of granular developer.

The fixing device 46 fixes the toner image on the sheet to the sheet by heating. The fixing device 46 includes a fixing rotating body 46a and a fixing heater 46b, wherein the fixing rotating body 46a rotates while in contact with the sheet and the fixing heater 46b heats the fixing rotating body 46a.

The image forming device 2 shown in FIG. 1 is a tandem-type color printer that is configured to execute the print process to process a color image. As a result, the print portion 4 includes four image creating portions 4x corresponding to four different colors of toner.

In addition, in the tandem-type image forming device 2, the transfer device 44 includes four primary transfer rollers 441, an intermediate transfer belt 440, a secondary transfer roller 442, and a belt cleaning device 443, wherein the four primary transfer rollers 441 correspond to four photoconductors 41.

The four image creating portions 4x respectively form cyan, magenta, yellow, and black toner images on the surfaces of the photoconductors 41. Each of the primary transfer rollers 441 is a part of a corresponding one of the image creating portions 4x.

In each of the image creating portions 4x, the primary transfer roller 441, while rotating, biases the intermediate transfer belt 440 toward the surface of the photoconductor 41. The primary transfer roller 441 transfers the toner image from the photoconductor 41 to the intermediate transfer belt 440. This allows a color image composed of toner images of four colors to be formed on the intermediate transfer belt 440.

In each of the image creating portions 4x, the drum cleaning device 45 removes and collects, from the photoconductor 41, toner that has remained on the photoconductor 41 without being transferred to the intermediate transfer belt 440.

The secondary transfer roller 442 transfers the toner images of the four colors from the intermediate transfer belt 440 to a sheet. It is noted that in the image processing apparatus 10, the photoconductor 41 and the intermediate transfer belt 440 of the transfer device 44 are each an example of an image carrier that rotates while carrying a toner image.

The belt cleaning device 443 removes and collects, from the intermediate transfer belt 440, toner that has remained on the intermediate transfer belt 440 without being transferred to the sheet.

As shown in FIG. 1, the image processing apparatus 10 includes a data processing portion 8 and a human interface device 800 in addition to the image forming device 2 and the image reading device 1. The human interface device 800 includes an operation portion 801 and a display portion 802.

The data processing portion 8 executes various types of data processing concerning the print process and the reading process, and controls various types of electric devices.

The operation portion 801 is a device configured to receive user operations. For example, the operation portion 801 includes either or both of a pushbutton and a touch panel. The display portion 802 includes a display panel that displays information for the users.

Figure 2:
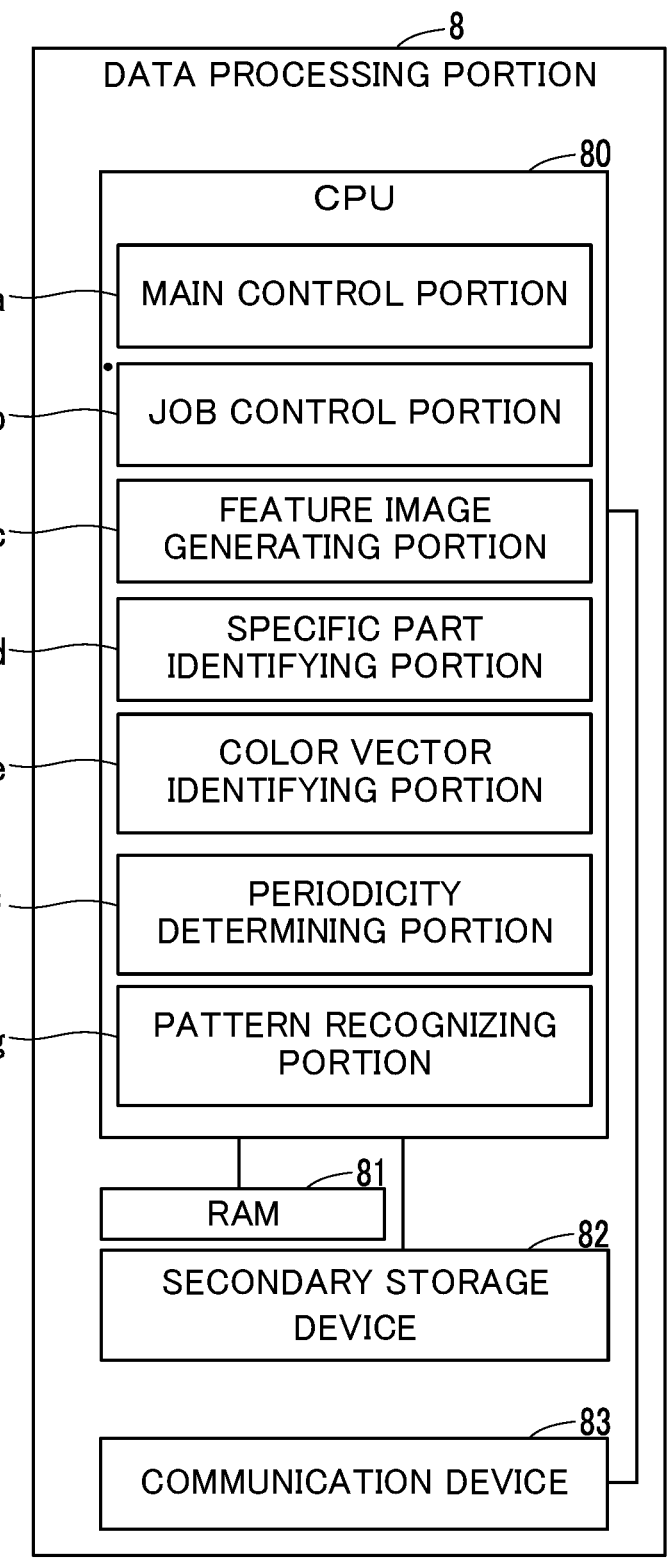
FIG. 2 is a block diagram showing a configuration of a data processing portion in the image processing apparatus according to the embodiment.

As shown in FIG. 2, the data processing portion 8 includes a CPU (Central Processing Unit) 80, a RAM (Random Access Memory) 81, a secondary storage device 82, and a communication device 83.

The CPU 80 is configured to process data received by the communication device 83, and perform controls of various types of image processing and the image forming device 2. The received data may include print data. The CPU 80 is an example of a processor that executes data processing including the image processing. It is noted that the CPU 80 may be realized by another type of processor such as a DSP (Digital Signal Processor).

The communication device 83 is a communication interface device that performs communication with other apparatuses such as the host apparatus via a network such as a LAN (Local Area Network). The CPU 80 performs data transmissions and receptions with the external apparatuses all via the communication device 83.

The secondary storage device 82 is a computer-readable nonvolatile storage device. The secondary storage device 82 stores computer programs executed by the CPU 80 and various types of data referenced by the CPU 80. For example, either or both of a flash memory and a hard disk drive are adopted as the secondary storage device 82.

The RAM 81 is a computer-readable volatile storage device. The RAM 81 primarily stores the computer programs executed by the CPU 80 and data that is output and referenced by the CPU 80 during execution of the programs.

The CPU 80 includes a plurality of processing modules that are realized when the computer programs are executed. The plurality of processing modules include a main control portion 8a and a job control portion 8b. It is noted that a part or all of the plurality of processing modules may be realized by another type of processor such as the DSP that is independent of the CPU 80.

The main control portion 8a executes a process to select a job in response to an operation performed on the operation portion 801, a process to display information on the display portion 802, and a process to set various types of data. Furthermore, the main control portion 8a executes a process to determine the content of data received by the communication device 83.

The job control portion 8b controls the image reading device 1 and the image forming device 2. For example, in a case where the data received by the communication device 83 includes print data, the job control portion 8b causes the image forming device 2 to execute the print process.

In addition, when the main control portion 8a has detected a copy request operation performed on the operation portion 801, the job control portion 8b causes the image reading device 1 to execute the reading process and causes the image forming device 2 to execute the print process based on an image obtained in the reading process.

In the print process, an image defect such as a vertical stripe Ps11, a horizontal stripe Ps12, a noise point Ps13, or density variation may be generated on an image formed on an output sheet (see FIG. 5).

As described above, the image forming device 2 executes the print process by the electrophotographic method. In this case, the image defect may be caused by any of various parts such as the photoconductor 41, the charging device 42, the developing device 43, and the transfer device 44. In addition, it requires skill to determine the cause of the image defect.

In the present embodiment, the image forming device 2 executes a test print process to form a predetermined original test image g01 on a sheet.

For example, when the main control portion 8a has detected a test output operation performed on the operation portion 801, the job control portion 8b causes the image forming device 2 to execute the test print process. In the following description, the sheet on which the original test image g01 has been formed is referred to as a test output sheet 9 (see FIG. 1).

Furthermore, when the test print process has been executed, the main control portion 8a displays a predetermined guide message on the display portion 802. The guide message urges setting the test output sheet 9 on the image reading device 1 and then performing a reading start operation on the operation portion 801.

When the main control portion 8a has detected the reading start operation performed on the operation portion 801 after the guide message was displayed on the display portion 802, the job control portion 8b causes the image reading device 1 to execute the reading process. This allows the original test image g01 to be read by the image reading device 1 from the test output sheet 9 output from the image forming device 2, and a read image corresponding to the original test image g01 is obtained.

Subsequently, as described below, the CPU 80 executes a process to determine the state of the image defect in the image forming device 2 based on the test image g1 (see FIG. 5). The test image g1 is the read image or a compressed image of the read image. The CPU 80 is an example of a processor.

It is noted that the original test image g01 may be read from the test output sheet 9 by a device such as a digital camera. It is noted that a process in which the image reading device 1 or the digital camera reads the original test image g01 from the test output sheet 9 is an example of an image reading process performed on the test output sheet 9.

Meanwhile, the noise point Ps13 or the horizontal stripe Ps12, each a type of image defect, may be generated due to a rotation failure of any one of a plurality of rotating bodies in the image creating portions 4x of the image forming device 2. The plurality of rotating bodies include the photoconductor 41, the charging roller 42a, the developing roller 43a, and the primary transfer rollers 441. In the following description, the rotating bodies related to the image creation are referred to as image creation rotating bodies.

When a rotation failure has occurred to an image creation rotating body, a periodic specific part such as a periodic noise point or a periodic horizontal stripe is apt to be generated in an output image output from the image forming device 2. The periodic specific parts are lined up in the vertical direction on the output image with a period corresponding to the outer peripheral length of the image creation rotating body having the rotation failure.

The output image may include the periodic specific part and a non-periodic specific part. The non-periodic specific part is the noise point Ps13 or the horizontal stripe Ps12 that is generated due to a cause other than the rotation failure of the image creation rotating body. In this case, in order to correctly determine the cause of the noise point Ps13 or the horizontal stripe Ps12, it is necessary to classify the noise point Ps13 or the horizontal stripe Ps12 into the periodic specific part or the non-periodic specific part.

In the image processing apparatus 10, the CPU 80 executes an image defect determination process that is described below (see FIG. 3). This makes it possible for the CPU 80 to classify the noise point Ps13 and the horizontal stripe Ps12 according to their causes based on the test image g1 that is obtained through the image reading process performed on the test output sheet 9.

Images such as the test image g1 targeted to be processed by the CPU 80 are digital image data. The digital image data constitutes, for each of three primary colors, map data that includes a plurality of pixel values corresponding to a two-dimensional coordinate area in a main scanning direction D1 and a sub scanning direction D2 crossing the main scanning direction D1. The three primary colors are, for example, red, green, and blue.

It is noted that the sub scanning direction D2 is perpendicular to the main scanning direction D1. It is noted that the main scanning direction D1 is a horizontal direction in the test image g1, and the sub scanning direction D2 is a vertical direction in the test image g1.

In the present embodiment, the original test image g01 and the test image g1 are each a mixed-color halftone image that is a combination of a plurality of uniform single-color halftone images that correspond to the plurality of developing colors used in the image forming device 2. The plurality of single-color halftone images are each formed uniformly with a predetermined halftone reference density.

In the present embodiment, the original test image g01 and the test image g1 are each a mixed-color halftone image that is generated by combining four uniform single-color halftone images that correspond to all developing colors used in the image forming device 2. In the test print process, one test output sheet 9 including one original test image g01 is output. Accordingly, one test image g1 corresponding to the original test image g01 is a particular target for identifying the image defect. The test image g1 in the present embodiment is an example of a mixed-color test image.

In addition, the plurality of processing modules of the CPU 80 further include, for the execution of the image defect determination process, a feature image generating portion 8c, a specific part identifying portion 8d, a color vector identifying portion 8e, a periodicity determining portion 8f, and a pattern recognizing portion 8g (see FIG. 2).

[Image Defect Determination Process]

Figure 3:
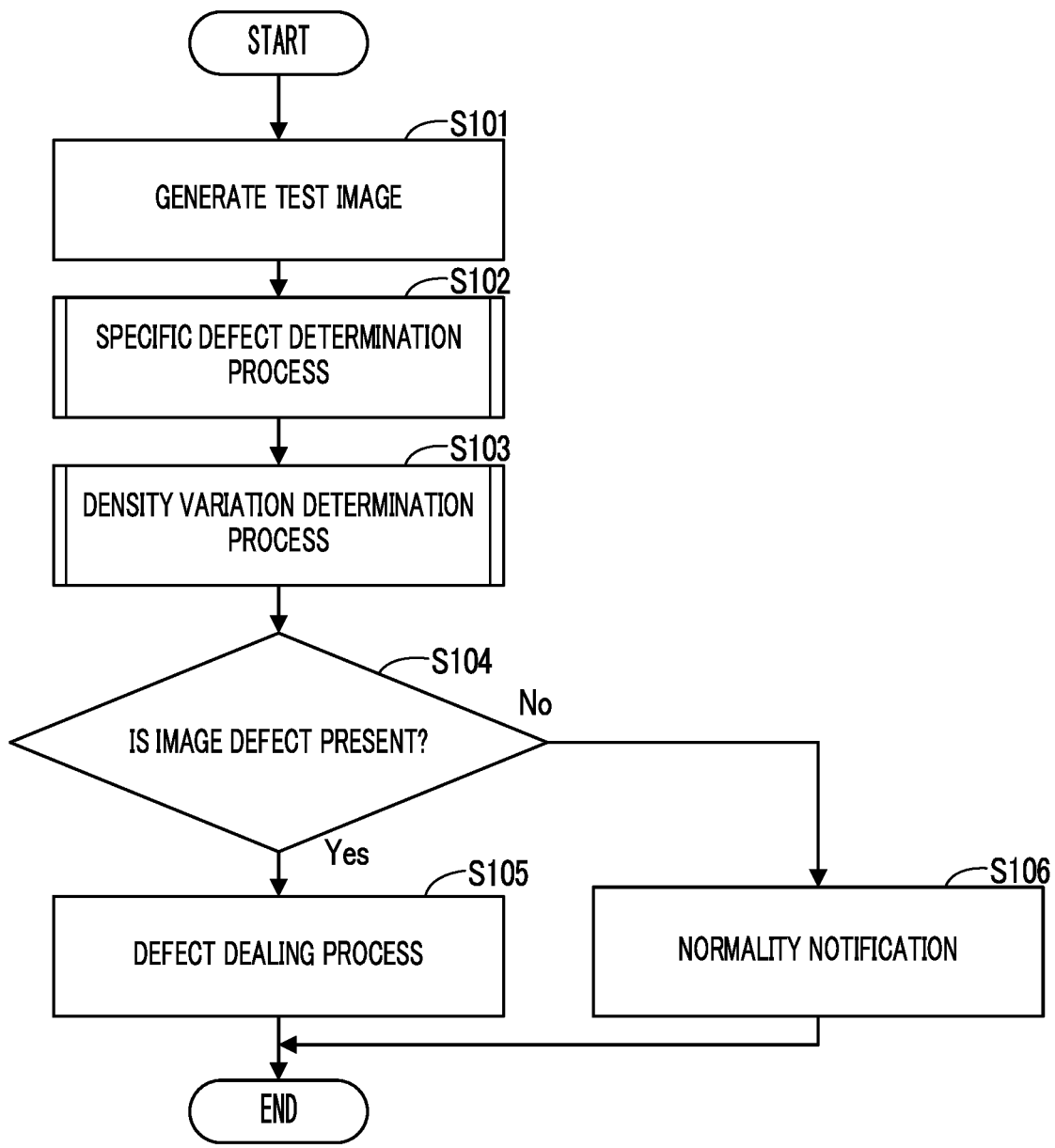
FIG. 3 is a flowchart showing an example of a procedure of an image defect determination process in the image processing apparatus according to the embodiment.

The following describes an example of a procedure of the image defect determination process with reference to the flowchart shown in FIG. 3. In the following description, S101, S102, . . . are identification signs representing a plurality of steps of the image defect determination process.

When the reading process is executed in response to the reading start operation performed on the operation portion 801 after the guide message is displayed on the display portion 802, the main control portion 8a causes the feature image generating portion 8c to execute step S101 of the image defect determination process.

<Step S101>

In step S101, the feature image generating portion 8c generates the test image g1 from the read image that was obtained in the image reading process performed on the test output sheet 9.

For example, the feature image generating portion 8c extracts, as the test image g1, an original image part from the read image, wherein the original image part is a part of the read image excluding a margin area at the outer edge.

Alternatively, the feature image generating portion 8c generates the test image g1 by performing a compression process to compress the original image part of the read image excluding the margin area at the outer edge to a predetermined reference resolution. When the resolution of the read image is higher than the reference resolution, the feature image generating portion 8c compresses the read image. After generating the test image g1, the main control portion 8a moves the process to step S102.

<Step S102>

In step S102, the feature image generating portion 8c starts a specific defect determination process that is described below. The specific defect determination process is performed to determine whether or not a specific part Ps1 such as the vertical stripe Ps11, the horizontal stripe Ps12, or the noise point Ps13 is present in the test image g1, and determine the cause of the specific part Ps1 (see FIG. 5). The specific part Ps1 is an example of the image defect.

Furthermore, when the specific defect determination process is completed, the main control portion 8a moves the process to step S103.

<Step S103>

In step S103, the periodicity determining portion 8f starts a density variation determination process that is described below. Furthermore, when the density variation determination process is completed, the main control portion 8a moves the process to step S104.

<Step S104>

In step S104, the main control portion 8a determines whether or not an image defect has occurred based on the processes of step S102 and step S103. Upon determining that an image defect has occurred, the main control portion 8a moves the process to step S105. Otherwise, the main control portion 8a moves the process to step S106.

<Step S105>

In step S105, the main control portion 8a executes a defect dealing process that had been preliminarily associated with the type and cause of the image defect that was determined to have occurred based on the process of step S102 or step S103.

For example, the defect dealing process includes either or both of a first dealing process and a second dealing process that are described below. The first dealing process is performed to display, on the display portion 802, a message that urges replacing a part that is the cause of the image defect. The second dealing process is performed to correct an image creation parameter so as to eliminate or alleviate the image defect. The image creation parameter is related to the control of the image creating portion 4x.

After executing the defect dealing process, the main control portion 8a ends the image defect determination process.

<Step S106>

On the other hand, in step S106, the main control portion 8a performs a normality notification to notify that no image defect was identified, and ends the image defect determination process.

[Specific Defect Determination Process]

Figure 4:
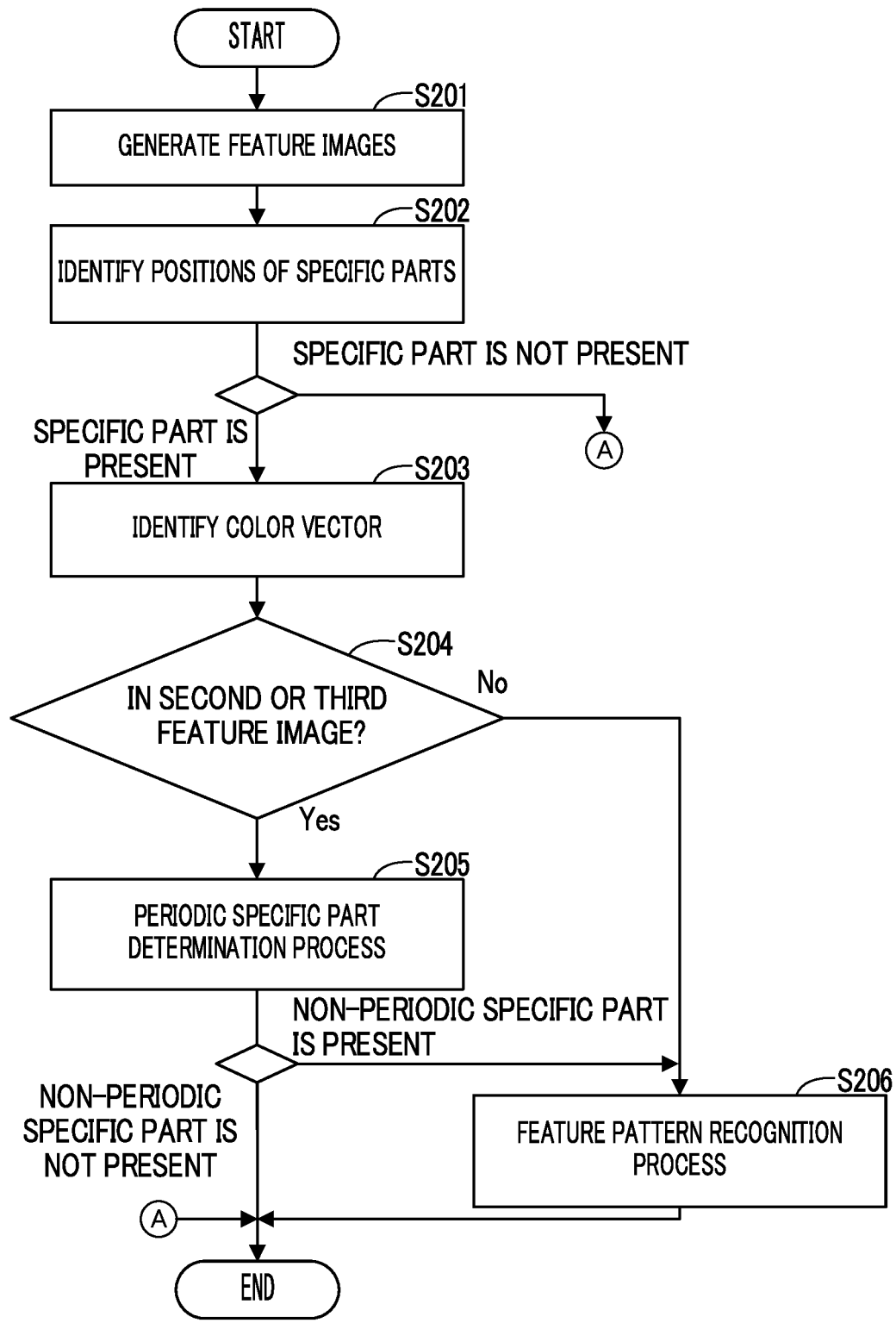
FIG. 4 is a flowchart showing an example of a procedure of a specific defect determination process in the image processing apparatus according to the embodiment.

Next, the following describes an example of a procedure of the specific defect determination process of step S102 with reference to the flowchart shown in FIG. 4. In the following description, S201, S202, . . . are identification signs representing a plurality of steps of the specific defect determination process. The specific defect determination process starts from step S201.

<Step S201>

First, in step S201, the feature image generating portion 8c generates a plurality of feature images g21, g22, and g23 by executing a predetermined feature extracting process on the test image g1. The plurality of feature images g21, g22, and g23 are images of specific parts Ps1 of predetermined particular types extracted from the test image g1.

In the present embodiment, the plurality of feature images g21, g22, and g23 include a first feature image g21, a second feature image g22, and a third feature image g23 (see FIG. 5).

The first feature image g21 is an image of the vertical stripe Ps11 extracted from the test image g1. The second feature image g22 is an image of the horizontal stripe Ps12 extracted from the test image g1. The third feature image g23 is an image of the noise point Ps13 extracted from the test image g1.

In the present embodiment, the feature extracting process includes a first pre-process, a second pre-process, and a specific part extracting process. In the following description, each of pixels that are sequentially selected from the test image g1 is referred to as a focused pixel Px1 (see FIG. 5).

The feature image generating portion 8c generates a first pre-process image g11 by executing the first pre-process on the test image g1 using the main scanning direction D1 as a processing direction Dx1 (see FIG. 5).

Furthermore, the feature image generating portion 8c generates a second pre-process image g12 by executing the second pre-process on the test image g1 using the sub scanning direction D2 as the processing direction Dx1 (see FIG. 5).

Furthermore, the feature image generating portion 8c generates the three feature images g21, g22, and g23 by executing the specific part extracting process on the first pre-process image g11 and the second pre-process image g12.

The first pre-process includes a main filter process in which the processing direction Dx1 is the main scanning direction D1. In the main filter process, the pixel value of each of the focused pixels Px1 sequentially selected from the test image g1 is converted to a conversion value that is obtained by performing a process to emphasize the difference between a pixel value of a focused area Ax1 and a pixel value of two adjacent areas Ax2 that are adjacent to the focused area Ax1 (see FIG. 5).

The focused area Ax1 includes the focused pixel Px1. The two adjacent areas Ax2 are adjacent to the focused area Ax1 from opposite sides in the processing direction Dx1 that is preliminarily set for the focused area Ax1. Each of the focused area Ax1 and the adjacent areas Ax2 includes one or more pixels.

The size of the focused area Ax1 and the adjacent areas Ax2 is set based on the width of the vertical stripe Ps11 or the horizontal stripe Ps12 to be extracted or the size of the noise point Ps13 to be extracted.

Each of the focused area Ax1 and the adjacent areas Ax2 occupies the same range in a direction crossing the processing direction Dx1. In the example shown in FIG. 6, the focused area Ax1 has 21 pixels of three columns and seven rows centered around the focused pixel Px1. Each of the adjacent areas Ax2 has 21 pixels of three columns and seven rows, too. In each of the focused area Ax1 and the adjacent areas Ax2, the number of rows is the number of lines along the processing direction Dx1, and the number of columns is the number of lines along a direction crossing the processing direction Dx1. The size of each of the focused area Ax1 and the adjacent areas Ax2 is preliminarily set.

In the main filter process, pixel values of pixels in the focused area Ax1 are converted to first correction values by using a predetermined first correction coefficient K1, and pixel values of pixels in the adjacent areas Ax2 are converted to second correction values by using a predetermined second correction coefficient K2.

For example, the first correction coefficient K1 is multiplied with each pixel value of the focused area Ax1 and is 1 (one) or greater, and the second correction coefficient K2 is multiplied with each pixel value of the adjacent areas Ax2 and is less than 0 (zero). In this case, the first correction coefficient K1 and the second correction coefficient K2 are set so that a sum of a value obtained by multiplying the first correction coefficient K1 by the number of pixels in the focused area Ax1 and a value obtained by multiplying the second correction coefficient K2 by the number of pixels in the two adjacent areas Ax2 becomes zero.

The feature image generating portion 8c derives the first correction values respectively corresponding to the pixels of the focused area Ax1 by multiplying the first correction coefficient K1 by each pixel value of the focused area Ax1, and derives the second correction values respectively corresponding to the pixels of the two adjacent areas Ax2 by multiplying the second correction coefficient K2 by each pixel value of the two adjacent areas Ax2. Subsequently, the feature image generating portion 8c derives, as the conversion value for the pixel value of each focused pixel Px1, a value by integrating the first correction value and the second correction value.

For example, the feature image generating portion 8c derives the conversion value by adding: a total value or an average value of a plurality of first correction values corresponding to a plurality of pixels of the focused area Ax1; and a total value or an average value of a plurality of second correction values corresponding to a plurality of pixels of the two adjacent areas Ax2.

An absolute value of the conversion value is an amplified absolute value of a difference between a pixel value of the focused area Ax1 and a pixel value of the two adjacent areas Ax2. The process to derive the conversion value by integrating the first correction value and the second correction value is an example of a process to emphasize the difference between the pixel value of the focused area Ax1 and the pixel value of two adjacent areas Ax2.

It is noted that the first correction coefficient K1 may be a negative number, and the second correction coefficient K2 may be a positive number.

The feature image generating portion 8c may generate, as the first pre-process image g11, first main map data that includes a plurality of conversion values that are obtained by performing the main filter process using the main scanning direction D1 as the processing direction Dx1.

As shown in FIG. 5, when the test image g1 includes either or both of the vertical stripe Ps11 and the noise point Ps13, the main filter process in which the processing direction Dx1 is the main scanning direction D1 generates the first main map data by extracting either or both of the vertical stripe Ps11 and the noise point Ps13 from the test image g1.

In addition, when the test image g1 includes the horizontal stripe Ps12, the main filter process in which the processing direction Dx1 is the main scanning direction D1 generates the first main map data by removing the horizontal stripe Ps12 from the test image g1.

It is noted that the vertical stripe Ps11 corresponds to the first specific part, the horizontal stripe Ps12 corresponds to the second specific part, and the noise point Ps13 corresponds to the third specific part.

On the other hand, the second pre-process includes the main filter process in which the processing direction Dx1 is the sub scanning direction D2.

For example, the feature image generating portion 8c may generate, as the second pre-process image g12, second main map data that includes a plurality of conversion values that are obtained by performing the main filter process using the sub scanning direction D2 as the processing direction Dx1.

As shown in FIG. 5, when the test image g1 includes either or both of the horizontal stripe Ps12 and the noise point Ps13, the main filter process in which the processing direction Dx1 is the sub scanning direction D2 generates the second main map data by extracting either or both of the horizontal stripe Ps12 and the noise point Ps13 from the test image g1.

In addition, when the test image g1 includes the vertical stripe Ps11, the main filter process in which the processing direction Dx1 is the sub scanning direction D2 generates the second main map data by removing the vertical stripe Ps11 from the test image g1.

However, the main filter process may derive erroneous conversion values that are reverse in positivity and negativity in edge portions at opposite ends of the specific part Ps1 in the processing direction Dx1 with respect to the conversion values indicating the status of the original specific part Ps1. When such erroneous conversion values are processed as pixel values indicating the specific part Ps1, the determination of the image defect may be adversely affected.

In view of the above, in the present embodiment, the first pre-process further includes an edge emphasizing filter process in which the processing direction Dx1 is the main scanning direction D1, in addition to the main filter process in which the processing direction Dx1 is the main scanning direction D1.

Similarly, the second pre-process further includes the edge emphasizing filter process in which the processing direction Dx1 is the sub scanning direction D2, in addition to the main filter process in which the processing direction Dx1 is the sub scanning direction D2.

In the edge emphasizing filter process, an edge emphasizing is performed on the focused area Ax1 and a predetermined one of the two adjacent areas Ax2.

Specifically, in the edge emphasizing filter process, the pixel value of each of the focused pixels Px1 sequentially selected from the test image g1 is converted to an edge intensity that is obtained by integrating a third correction value and a fourth correction value, wherein the third correction value is obtained by correcting the pixel value of each pixel in the focused area Ax1 by a positive or negative third correction coefficient K3, and the fourth correction value is obtained by correcting the pixel value of each pixel in one of the two adjacent areas Ax2 by a fourth correction coefficient K4 that is reverse to the third correction coefficient K3 in positivity and negativity (see FIG. 5).

In the example shown in FIG. 5, the third correction coefficient K3 is a positive coefficient and the fourth correction coefficient K4 is a negative coefficient. The third correction coefficient K3 and the fourth correction coefficient K4 are set so that a sum of a value obtained by multiplying the third correction coefficient K3 by the number of pixels in the focused area Ax1 and a value obtained by multiplying the fourth correction coefficient K4 by the number of pixels in the one of the two adjacent areas Ax2 becomes zero.

The execution of the edge emphasizing filter process by using the main scanning direction D1 as the processing direction Dx1 generates horizontal edge strength map data in which the pixel value of each pixel in the test image g1 has been converted to the edge strength.

Similarly, the execution of the edge emphasizing filter process by using the sub scanning direction D2 as the processing direction Dx1 generates vertical edge strength map data in which the pixel value of each pixel in the test image g1 has been converted to the edge strength.

In the present embodiment, the feature image generating portion 8c generates the first main map data by executing the main filter process using the main scanning direction D1 as the processing direction Dx1.

Furthermore, the feature image generating portion 8c generates the horizontal edge strength map data by executing the edge emphasizing filter process using the main scanning direction D1 as the processing direction Dx1.

Furthermore, the feature image generating portion 8c generates the first pre-process image g11 by correcting each pixel value of the first main map data by each corresponding pixel value of the horizontal edge strength map data. For example, the feature image generating portion 8c generates the first pre-process image g11 by adding an absolute value of each pixel value of the horizontal edge strength map data to each pixel value of the first main map data.

Similarly, the feature image generating portion 8c generates the second main map data by executing the main filter process using the sub scanning direction D2 as the processing direction Dx1.

Furthermore, the feature image generating portion 8c generates the vertical edge strength map data by executing the edge emphasizing filter process using the sub scanning direction D2 as the processing direction Dx1.

Furthermore, the feature image generating portion 8c generates the second pre-process image g12 by correcting each pixel value of the second main map data by each corresponding pixel value of the vertical edge strength map data. For example, the feature image generating portion 8c generates the second pre-process image g12 by adding an absolute value of each pixel value of the vertical edge strength map data to each pixel value of the second main map data.

In the specific part extracting process, the three feature images g21, g22, and g23 are generated by extracting the vertical stripe Ps11, the horizontal stripe Ps12, and the noise point Ps13 individually from the first pre-process image g11 or the second pre-process image g12. The three feature images g21, g22, and g23 are the first feature image g21, the second feature image g22, and the third feature image g23.

The first feature image g21 is formed by extracting, among specific parts Ps1 which are each composed of one or more significant pixels and are present in the first pre-process image g11 and the second pre-process image g12, a specific part Ps1 that is present in the first pre-process image g11 and is not common to the first pre-process image g11 and the second pre-process image g12. The first feature image g21 does not include the horizontal stripe Ps12 and the noise point Ps13. In addition, when the first pre-process image g11 includes the vertical stripe Ps11, the first feature image g21 includes the vertical stripe Ps11.

It is noted that the significant pixels are distinguished from the other pixels in the test image g1 when each pixel value of the test image g1, or an index value based on each pixel value, is compared with a predetermined threshold.

The second feature image g22 is formed by extracting, among the specific parts Ps1 that are present in the first pre-process image g11 and the second pre-process image g12, as the horizontal stripe Ps12, a specific part Ps1 that is present in the second pre-process image g12 and is not common to the first pre-process image g11 and the second pre-process image g12. The second feature image g22 does not include the vertical stripe Ps11 and the noise point Ps13. In addition, when the second pre-process image g12 includes the horizontal stripe Ps12, the second feature image g22 includes the horizontal stripe Ps12.

The third feature image g23 is formed by extracting, as the noise point Ps13, a specific part Ps1 that is common to the first pre-process image g11 and the second pre-process image g12. The third feature image g23 does not include the vertical stripe Ps11 and the horizontal stripe Ps12. In addition, when the first pre-process image g11 and the second pre-process image g12 include the noise point Ps13, the third feature image g23 includes the noise point Ps13.

There may be various methods for generating three feature images g21, g22, and g23 from the first pre-process image g11 and the second pre-process image g12.

For example, the feature image generating portion 8c derives an index value Zi by applying a first pixel value Xi and a second pixel value Yi to the following formula (1), wherein the first pixel value Xi represents each pixel value that exceeds a predetermined reference value in the first pre-process image g11, and the second pixel value Yi represents each pixel value that exceeds the reference value in the second pre-process image g12. Here, the subscription "i" denotes the position identification number of each pixel.

[Math 1]

$$Zi = \frac{|Xi| - |Yi|}{|Xi| + |Yi|} \quad (1)$$

The index value Zi of each pixel constituting the vertical stripe Ps11 is a relatively large positive number. In addition, the index value Zi of each pixel constituting the horizontal stripe Ps12 is a relatively small negative number. In addition, the index value Zi of each pixel constituting the noise point Ps13 is 0 (zero) or a value close to 0 (zero). The index value Zi is an example of an index value of a difference between each pixel value of the first pre-process image g11 and each corresponding pixel value of the second pre-process image g12.

The above-mentioned nature of the index value Zi can be used to simplify the process of extracting the vertical stripe Ps11 from the first pre-process image g11, extracting the horizontal stripe Ps12 from the second pre-process image g12, and extracting the noise point Ps13 from the first pre-process image g11 or the second pre-process image g12.

For example, the feature image generating portion 8c generates the first feature image g21 by converting the first pixel value Xi in the first pre-process image g11 to a first specificity Pi that is derived by the following formula (2). This generates the first feature image g21 that includes the vertical stripe Ps11 extracted from the first pre-process image g11.

[Math 2]

$$Pi = XiZi \quad (2)$$

Furthermore, the feature image generating portion 8c generates the second feature image g22 by converting the second pixel value Yi in the second pre-process image g12 to a second specificity Qi that is derived by the following formula (3). This generates the second feature image g22 that includes the horizontal stripe Ps12 extracted from the second pre-process image g12.

[Math 3]

$$Qi = Yi(-Zi) \quad (3)$$

Furthermore, the feature image generating portion 8c generates the third feature image g23 by converting the first pixel value Xi in the first pre-process image g11 to a third specificity Ri that is derived by the following formula (4). This generates the third feature image g23 that includes the noise point Ps13 extracted from the first pre-process image g11.

[Math 4]

$$Ri = Xi(1-Zi) \quad (4)$$

Alternatively, the feature image generating portion 8c may generate the third feature image g23 by converting the second pixel value Yi in the second pre-process image g12 to the third specificity Ri that is derived by the following formula (5). This generates the third feature image g23 that includes the noise point Ps13 extracted from the second pre-process image g12.

[Math 5]

$$Ri = Yi(Zi-1) \quad (5)$$

As described above, the feature image generating portion 8c generates the first feature image g21 by converting each pixel value in the first pre-process image g11 by a predetermined formula (2) that is based on the index value Zi. The formula (2) is an example of a first conversion formula.

Furthermore, the feature image generating portion 8c generates the second feature image g22 by converting each pixel value in the second pre-process image g12 by a predetermined formula (3) that is based on the index value Zi. The formula (3) is an example of a second conversion formula.

Furthermore, the feature image generating portion 8c generates the third feature image g23 by converting each pixel value in the first pre-process image g11 or the second pre-process image g12 by a predetermined formula (4) or formula (5) that is based on the index value Zi. The formula (4) and the formula (5) are each an example of a third conversion formula.

The process of step S201 in which the first feature image g21, the second feature image g22, and the third feature image g23 are generated is an example of a process to generate images that respectively include the vertical stripe Ps11, the horizontal stripe Ps12, and the noise point Ps13 extracted from the test image g1.

The process of step S201 in which the first feature image g21, the second feature image g22, and the third feature image g23 are generated is an example of a process in which the vertical stripe Ps11, the horizontal stripe Ps12, and the noise point Ps13 of the one or more specific parts Ps1 are extracted as the image defects from the first pre-process image g11 and the second pre-process image g12.

The process to generate the second feature image g22 in step S201 is an example of a process to generate an extraction image by extracting, as the horizontal stripe Ps12, among one or more specific parts Ps1 in the first pre-process image g11 and the second pre-process image g12, a specific part Ps1 that is present in the second pre-process image g12 and is not common to the first pre-process image g11 and the second pre-process image g12.

The process to generate the third feature image g23 in step S201 is an example of a process to generate an extraction image by extracting, as the noise point Ps13, among one or more specific parts Ps1 in the first pre-process image g11 and the second pre-process image g12, a specific part Ps1 that is common to the first pre-process image g11 and the second pre-process image g12.

The second feature image g22 is an example of an extraction image that includes the horizontal stripe Ps12 extending in the horizontal direction, extracted from the test image g1. The third feature image g23 is an example of an extraction image that includes the noise point Ps13 extracted from the test image g1.

After generating the feature images g21, g22, and g23, the feature image generating portion 8c moves the process to step S202.

<Step S202>

In step S202, the specific part identifying portion 8d identifies the positions of the specific parts Ps1 in the feature images g21, g22, and g23.

For example, the specific part identifying portion 8d determines, as the specific part Ps1, a part that includes a pixel value that is out of a predetermined reference range in the feature images g21, g22, and g23.

In other words, the specific part identifying portion 8d identifies, as the specific parts Ps1, parts where the specificities Pi, Qi, Ri that are based on the pixel values of the first pre-process image g11 and the second pre-process image g12 are out of the reference range. The specificities Pi, Qi, Ri are examples of conversion values that are based on the pixel values of the first pre-process image g11 and the second pre-process image g12. In addition, the process of the feature image generating portion 8c in the present embodiment is an example of a process to identify the specific part Ps1 composed of one or more significant pixels in the test image g1.

In addition, the specific part identifying portion 8d executes, on each of the feature images g21, g22, and g23, a coupling process in which, when a plurality of specific parts Ps1 are present in a predetermined proximity range in the main scanning direction D1 or the sub scanning direction D2, the specific parts Ps1 are coupled into one series of specific parts Ps1.

For example, when the first feature image g21 includes two vertical stripes Ps11 that are lined up in parallel at an interval in the sub scanning direction D2 in the proximity range, the specific part identifying portion 8d executes the coupling process to couple the two vertical stripes Ps11 into one vertical stripe Ps11.

Similarly, when the second feature image g22 includes two horizontal stripes Ps12 that are lined up in parallel at an interval in the main scanning direction D1 in the proximity range, the specific part identifying portion 8d executes the coupling process to couple the two horizontal stripes Ps12 into one horizontal stripe Ps12.

In addition, when the third feature image g23 includes a plurality of noise points Ps13 that are lined up in parallel at intervals in the main scanning direction D1 or in the sub scanning direction D2 in the proximity range, the specific part identifying portion 8d executes the coupling process to couple the plurality of noise points Ps13 into one noise point Ps13.

The specific part identifying portion 8d ends the specific defect determination process when it has failed to identify the positions of the specific parts Ps1 in the three feature images g21, g22, and g23. On the other hand, the specific part identifying portion 8d moves the process to step S203 when it has identified the positions of the specific parts Ps1 in one or more of the three feature images g21, g22, and g23.

<Step S203>

In step S203, the color vector identifying portion 8e identifies a color vector that represents a vector in a color space from one of a color of the specific part Ps1 in the test image g1 and a color of a reference area including the periphery of the specific part Ps1 to the other.

The reference area is an area of a predetermined range decided on the basis of the specific part Ps1. For example, the reference area includes a peripheral area adjacent to the specific part Ps1 and does not include the specific part Ps1. In addition, the reference area may include the specific part Ps1 and a peripheral area adjacent to the specific part Ps1.

The test image g1 is originally a uniform halftone image. As a result, when an excellent test image g1 is formed on the test output sheet 9, the specific part Ps1 is not identified, and the color vector at any position in the test image g1 is approximately zero vector.

On the other hand, when the specific part Ps1 is identified, the direction of the color vector between the specific part Ps1 and the reference area corresponding to the specific part Ps1 indicates an excess or a shortage of the toner density in any of the four developing colors in the image forming device 2.

Accordingly, the direction of the color vector indicates, as the cause of the specific part Ps1, any of the four image creating portions 4x in the image forming device 2.

It is noted that the color vector identifying portion 8e may identify, as the color vector, a vector in a color space from one of a color of the specific part Ps1 in the test image g1 and a predetermined reference color to the other. In this case, the reference color is the original color of the test image g1.

In step S203, the color vector identifying portion 8e, based on the color vector, further determines a developing color that is the cause of the specific part Ps1, and the excess/shortage state of the density of the developing color.

For example, the secondary storage device 82 preliminarily stores information of a plurality of unit vectors that indicate, for each of cyan, magenta, yellow, and black, the directions in which the density increases and decreases with respect to the reference color of the test image g1.

The color vector identifying portion 8e normalizes the color vector to a predetermined unit length. Furthermore, the color vector identifying portion 8e determines a developing color that is the cause of the specific part Ps1 and the excess/shortage state of the density of the developing color by determining which of the plurality of unit vectors that correspond to increase of decrease of the density of cyan, magenta, yellow, or black approximates most closely to the color vector after the normalization.

After executing the process of step S203, the color vector identifying portion 8e moves the process to step S204.

<Step S204>

In step S204, the periodicity determining portion 8f moves the process to step S205 when the specific part Ps1 has been identified in either or both of the second feature image g22 and the third feature image g23. Otherwise, the periodicity determining portion 8f moves the process to step S206.

In the following description, either or both of the second feature image g22 and the third feature image g23 in which the specific part Ps1 has been identified is referred to as a periodicity determination target image.

The specific part Ps1 in the periodicity determination target image is the horizontal stripe Ps12 or the noise point Ps13 (see FIG. 5). The horizontal stripe Ps12 or the noise point Ps13 in the periodicity determination target image corresponds to a target specific part.

<Step S205>

In step S205, the periodicity determining portion 8f executes a periodic specific part determination process on the periodicity determination target image.

When the image defect occurs due to a defect of one of the image creation rotating bodies, the periodicity corresponding to the outer peripheral length of the image creation rotating body may appear as an interval in the sub scanning direction D2 between a plurality of horizontal stripes Ps12 or a plurality of noise points Ps13. The state of the image creation rotating body influences the quality of the image formed on the sheet.

In a case where the periodicity determination target image has a periodicity corresponding to the outer peripheral length of an image creation rotating body, it can be said that the image creation rotating body corresponding to the periodicity is the cause of the horizontal stripes Ps12 or the noise points Ps13 in the periodicity determination target image.

In a periodic specific part determination process, it is determined whether or not one or more predetermined periodicities are present along the sub scanning direction D2 in the periodicity determination target image, and the cause of the specific part Ps1 is determined based on the result of the determination concerning periodicity. The periodicity corresponds to the outer peripheral length of the image creation rotating body.

A particular example of the periodic specific part determination process is described below (see FIG. 7). As described below, in the periodic specific part determination process, the periodicity determining portion 8f classifies the specific parts Ps1 included in the periodicity determination target image into: the periodic specific part having the periodicity; and the non-periodic specific part being specific part other than the periodic specific part.

Upon determining, as a result of the process of step S205, that the second feature image g22 and the third feature image g23 do not include the non-periodic specific part, the periodicity determining portion 8f ends the specific defect determination process.

On the other hand, upon determining, as a result of the process of step S205, that the second feature image g22 and the third feature image g23 include the non-periodic specific part, the periodicity determining portion 8f moves the process to step S206.

<Step S206>

In step S206, the pattern recognizing portion 8g executes the feature pattern recognition process on the first feature image g21 and each of the second feature image g22 and the third feature image g23 that each include the non-periodic specific part. The second feature image g22 including the non-periodic specific part or the third feature image g23 including the non-periodic specific part is an example of a non-periodic feature image.

In the feature pattern recognition process, the first feature image g21 and the second feature image g22 and the third feature image g23 that each include the non-periodic specific part are treated as input images. In the feature pattern recognition process, the pattern recognizing portion 8g performs a pattern recognition on each input image to determine which of a plurality of predetermined cause candidates corresponding to the image defects corresponds to the input image.

In addition, the input image of the feature pattern recognition process may include the horizontal edge strength map data or the vertical edge strength map data obtained in the edge emphasizing filter process. For example, in the feature pattern recognition process to determine the vertical stripe Ps11, the first feature image g21 and the horizontal edge strength map data may be used as the input image.

Similarly, in the feature pattern recognition process to determine the horizontal stripe Ps12, the second feature image g22 and the vertical edge strength map data may be used as the input image.

Similarly, in the feature pattern recognition process to determine the noise point Ps13, the third feature image g23 and either or both of the horizontal edge strength map data and the vertical edge strength map data may be used as the input image.

For example, in the feature pattern recognition process, an input image is classified into one of the plurality of cause candidates based on a learning model that has been preliminarily learned using, as teacher data, a plurality of sample images corresponding to the plurality of cause candidates.

For example, a classification-type machine learning algorithm called random forests, a machine learning algorithm called SVM (Support Vector Machine), or a CNN (Convolutional Neural Network) algorithm may be adopted in the learning model.

The learning model is prepared individually for each of the first feature image g21 and each of the second feature image g22 and the third feature image g23 that each include the non-periodic specific part. In addition, the plurality of sample images are used as the teacher data for each of the cause candidates.

In addition, in step S206, the pattern recognizing portion 8g determines which of the four image creating portions 4x having different developing colors is the cause of the vertical stripe Ps11, the horizontal stripe Ps12, or the noise point Ps13 based on the color vector identified in step S203.

In step S206, the cause of the vertical stripe Ps11 and the cause of the horizontal stripe Ps12 and the noise point Ps13 that were identified as the non-periodic specific parts are determined. After executing the process of step S206, the pattern recognizing portion 8g ends the specific defect determination process.

As described above, the feature image generating portion 8c generates the first pre-process image g11 by executing the first pre-process including the main filter process using the horizontal direction of the test image g1 as the processing direction Dx1. In the main filter process, the pixel value of each of the focused pixels Px1 sequentially selected from the test image g1 is converted to a conversion value that is obtained by performing a process to emphasize the difference between a pixel value of the focused area Ax1 and a pixel value of two adjacent areas Ax2 that are adjacent to the focused area Ax1 from opposite sides in the processing direction Dx1 that is preliminarily set for the focused area Ax1 (see step S201 of FIG. 4, FIG. 6).

Figure 6:
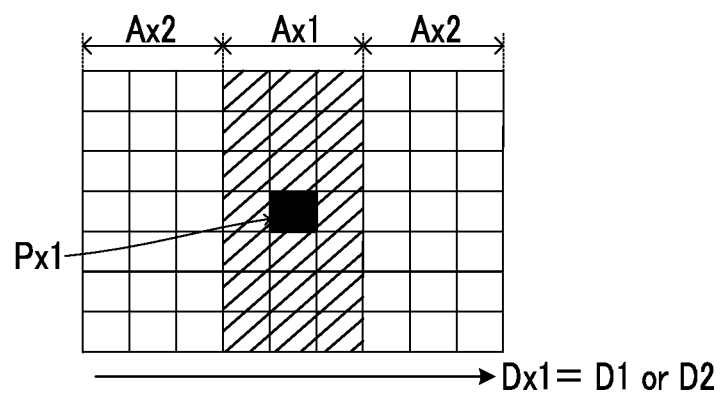
FIG. 6 is a diagram showing an example of a focused area and adjacent areas that are sequentially selected from the test image in a main filter process executed by the image processing apparatus according to the embodiment.

Furthermore, the feature image generating portion 8c generates the second pre-process image g12 by executing the second pre-process including the main filter process using the vertical direction of the test image g1 as the processing direction Dx1 (see step S201 of FIG. 4, FIG. 6).

Furthermore, the feature image generating portion 8c extracts, as the image defects, the vertical stripe Ps11, the horizontal stripe Ps12, and the noise point Ps13 of the one or more specific parts Ps1 in the first pre-process image g11 and the second pre-process image g12 (see step S201 of FIG. 4, FIG. 6).

The feature extracting process of step S201 is a simple process with a small operation load. Such a simple process makes it possible to generate three feature images g21, g22, and g23 that respectively include specific parts Ps1 of different shapes that are extracted from one test image g1.

[Periodic Specific Part Determination Process]

Figure 7:
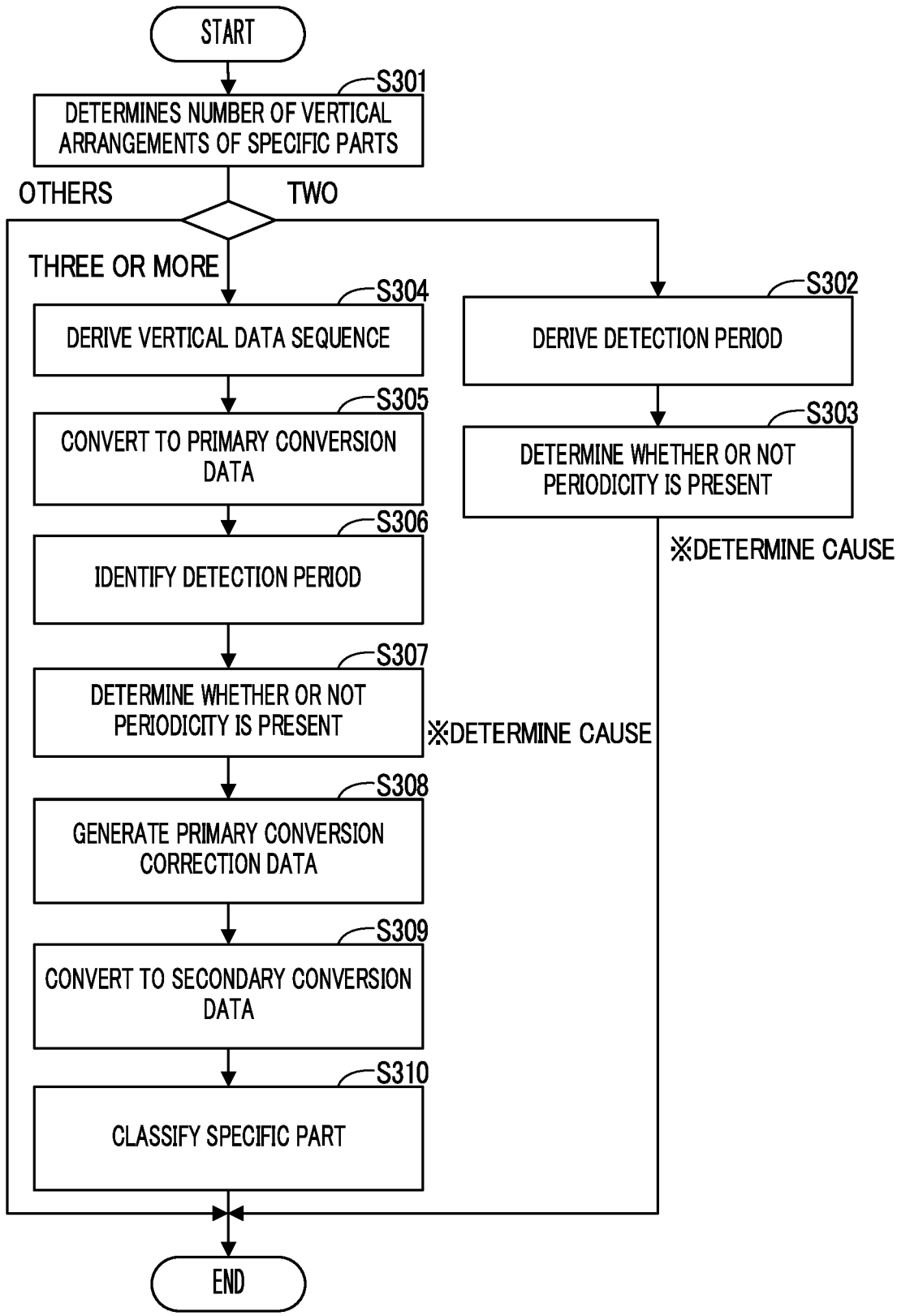
FIG. 7 is a flowchart showing an example of a procedure of a periodic specific part determination process in the image processing apparatus according to the embodiment.

Next, the following describes an example of a procedure of the periodic specific part determination process of step S205 with reference to the flowchart shown in FIG. 7. In the following description, S301, S302, . . . are identification signs representing a plurality of steps of the periodic specific part determination process. The periodic specific part determination process starts from step S301.

<Step S301>

First, in step S301, the feature image generating portion 8c determines the number of vertical arrangements that is the number of specific parts Ps1 lined up in the sub scanning direction D2 in the periodicity determination target image.

Figure 8:
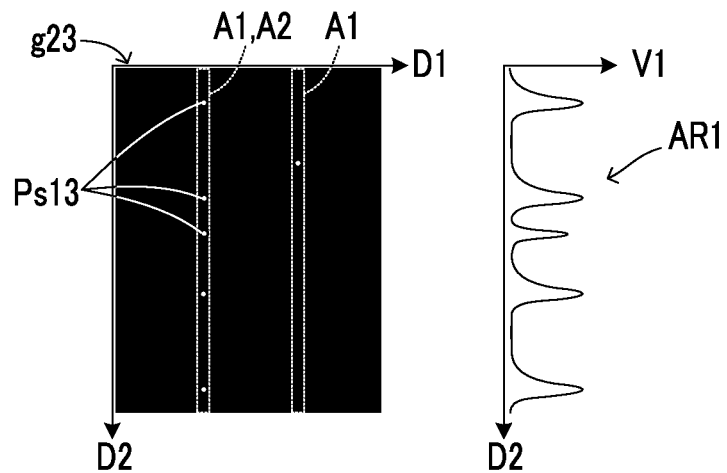
FIG. 8 is a diagram showing an example of a periodicity determination target image and an example of a pixel value distribution of a target vertical data sequence in the periodicity determination target image.

Specifically, the feature image generating portion 8c determines the number of vertical arrangements of noise points Ps13 by counting the number of specific parts Ps1 that are present in a band-like area A1 that extends in the sub scanning direction D2 with a predetermined width in the main scanning direction D1 (see FIG. 8). The band-like area A1 extends in the sub scanning direction D2 over the whole length of the third feature image g23.

Furthermore, when a plurality of noise points Ps13 are present in the band-like area A1, the periodicity determining portion 8f sets the band-like area A1 as a target area A2 of the third feature image g23 (see FIG. 8).

In addition, the periodicity determining portion 8f counts the number of vertical arrangements of horizontal stripes Ps12 by counting, in the second feature image g22, the number of horizontal stripes Ps12 lined up in the sub scanning direction D2 in which parts occupying the same range in the main scanning direction D1 exceed a predetermined overlapping ratio.

Furthermore, when a plurality of horizontal stripes Ps12 that overlap exceeding the overlapping ratio in the main scanning direction D1 are present in the second feature image g22, the periodicity determining portion 8f sets, as the target area A2 of the second feature image g22, an area that includes the plurality of horizontal stripes Ps12 and extends in the sub scanning direction D2 over the whole length of the second feature image g22.

For example, the periodicity determining portion 8f sets, as a range of the target area A2 in the main scanning direction D1, a range occupied in the main scanning direction D1 by a plurality of horizontal stripes Ps12 that satisfy the condition of the overlapping ratio. It is noted that the whole area of the second feature image g22 may be set as the target area A2 of the second feature image g22.

When the number of vertical arrangements is less than 2 (two), the periodicity determining portion 8f ends the periodic specific part determination process. When the number of vertical arrangements is 1 (one), the periodicity determining portion 8f determines that the specific part Ps1 corresponding to the number of vertical arrangements is the non-periodic specific part.

When the number of vertical arrangements is 2 (two), the periodicity determining portion 8f moves the process to step S302. When the number of vertical arrangements is 3 (three) or more, the periodicity determining portion 8f moves the process to step S304. The target area A2 of the second feature image g22 or the third feature image g23 that is a target of the process of steps S304 to S310 described below is an area in which three or more specific parts Ps1 are lined up in the vertical direction.

<Step S302>

In step S302, the periodicity determining portion 8f derives an interval in the sub scanning direction D2 between two specific parts Ps1 lined up in the sub scanning direction D2, as a detection period for the two specific parts Ps1. The detection period identified in step S302 is a space period of two specific parts Ps1 lined up in the sub scanning direction D2 in the periodicity determination target image.

Thereafter, the periodicity determining portion 8f moves the process to step S303.

<Step S303>

In step S303, the periodicity determining portion 8f determines whether or not the two specific parts Ps1 have the periodicity based on the detection period derived in step S302.

Specifically, the periodicity determining portion 8f determines that the two specific parts Ps1 have the periodicity when the detection period satisfies a predetermined period approximate condition with respect to any one of a plurality of predetermined candidates for outer peripheral length. The specific parts Ps1 that have been determined as having the periodicity are the periodic specific parts.

The plurality of candidates for outer peripheral length are outer peripheral lengths of a plurality of image creation rotating bodies that are candidates for the cause of the horizontal stripe Ps12 or the noise point Ps13.

In step S303, the periodicity determining portion 8f determines that an image creation rotating body corresponding to the one of the plurality of candidates for outer peripheral length that has been determined as satisfying the approximate condition, is the cause of the periodic specific parts.

In addition, in step S303, the periodicity determining portion 8f determines, based on the color vector determined in step S203, which of the image creation rotating bodies of the four image creating portions 4x of different developing colors is the cause of the horizontal stripe Ps12 or the noise point Ps13.

On the other hand, the periodicity determining portion 8f determines that the two specific parts Ps1 do not have the periodicity when the detection period does not satisfy the period approximate condition with respect to all of the plurality of candidates for outer peripheral length. The specific parts Ps1 that have been determined as not having the periodicity are the non-periodic specific parts.

After executing the process of step S303, the periodicity determining portion 8f ends the periodic specific part determination process.

<Step S304>

In step S304, the periodicity determining portion 8f derives, based on the periodicity determination target image, a vertical data sequence AR1 that corresponds to three or more specific parts Ps1 lined up in the sub scanning direction D2 (see FIG. 8). The vertical data sequence AR1 is a data sequence of representative values V1 that are each a representative value of a plurality of pixel values of each line extending in the main scanning direction D1 in the target area A2 of the periodicity determination target image.

The periodicity determining portion 8f derives the vertical data sequence AR1 for each color of red, green, and blue with respect to the periodicity determination target image.

In the following description, the representative value V1 for each line extending in the main scanning direction D1 in the target area A2 of the second feature image g22 is referred to as a first representative value. In addition, the representative value V1 for each line extending in the main scanning direction D1 in the target area A2 of the third feature image g23 is referred to as a second representative value.

First, the following describes an example of the process of step S304 when the second feature image g22 is the periodicity determination target image.

In step S304, the periodicity determining portion 8f derives, as the first representative value, an average value or a median value of a plurality of pixel values for each line extending in the main scanning direction D1 in the target area A2 of the second feature image g22.

Furthermore, the periodicity determining portion 8f derives, as the vertical data sequence AR1 corresponding to the second feature image g22, a sequence of first representative values corresponding to all lines extending in the main scanning direction D1 in the target area A2 of the second feature image g22.

Next, the following describes an example of the process of step S304 when the third feature image g23 is the periodicity determination target image.

In step S304, the periodicity determining portion 8f derives, as the second representative value, an average value or a median value of a plurality of pixel values for each line extending in the main scanning direction D1, with respect to the lines extending in the main scanning direction D1 in which the noise point Ps13 is not present in the target area A2 of the third feature image g23.

On the other hand, with regard to the lines extending in the main scanning direction D1 in which the noise point Ps13 is present in the target area A2 of the third feature image g23, the periodicity determining portion 8f derives, as the second representative value, an average value or a median value of pixel values of a part that forms the noise point Ps13 in the line extending in the main scanning direction D1.

Furthermore, the periodicity determining portion 8f derives, as the vertical data sequence AR1 corresponding to the third feature image g23, a sequence of second representative values corresponding to all lines extending in the main scanning direction D1 in the target area A2 of the third feature image g23.

FIG. 8 shows an example of the periodicity determination target image and the vertical data sequence AR1 corresponding thereto, when the third feature image g23 is the periodicity determination target image. The vertical data sequence AR1 is data of a space domain that is the target of a frequency analysis.

After deriving the vertical data sequence AR1, the periodicity determining portion 8f moves the process to step S305.

<Step S305>

In step S305, the periodicity determining portion 8f converts the vertical data sequence AR1 to primary conversion data of a frequency domain by performing Fourier conversion on the vertical data sequence AR1.

The primary conversion data represents frequency characteristics of the vertical data sequence AR1. Thereafter, the periodicity determining portion 8f moves the process to step S306.

<Step S306>

In step S306, the periodicity determining portion 8f identifies a dominant frequency in a frequency distribution represented by the primary conversion data. Furthermore, the periodicity determining portion 8f identifies, as the detection period, a period that corresponds to the dominant frequency.

The detection period identified in step S306 is a main space period of three or more specific parts Ps1 lined up in the sub scanning direction D2 in the periodicity determination target image. Thereafter, the periodicity determining portion 8f moves the process to step S307.

<Step S307>

In step S307, the periodicity determining portion 8f determines whether or not the specific parts Ps1 corresponding to the vertical data sequence AR1 have one or more periodicities, based on the detection period identified in step S306.

The process of step S307 is the same as the process of step S303. That is, the periodicity determining portion 8f determines that the three or more specific parts Ps1 have the periodicity when the detection period identified in step S306 satisfies the period approximate condition with respect to any one of the plurality of candidates for outer peripheral length. The specific parts Ps1 that have been determined as having the periodicity are the periodic specific parts.

As described above, the plurality of candidates for outer peripheral length are outer peripheral lengths of a plurality of image creation rotating bodies that are candidates for the cause of the horizontal stripe Ps12 or the noise point Ps13.

In step S307, the periodicity determining portion 8f determines that an image creation rotating body corresponding to the one of the plurality of candidates for outer peripheral length that has been determined as satisfying the approximate condition, is the cause of the periodic specific parts.

In addition, in step S307, the periodicity determining portion 8f determines, based on the color vector determined in step S203, which of the image creation rotating bodies of the four image creating portions 4x of different developing colors is the cause of the horizontal stripe Ps12 or the noise point Ps13.

After executing the process of step S307, the periodicity determining portion 8f moves the process to step S308.

<Step S308>

In step S308, the periodicity determining portion 8f generates primary conversion correction data by removing data of frequency bands other than a particular frequency band from the primary conversion data.

The particular frequency band is a frequency band corresponding to the periodic specific part. In other words, the particular frequency band is a frequency band corresponding to a detection period that has been determined as satisfying the period approximate condition with respect to any one of the plurality of candidates for outer peripheral length.

After executing the process of step S308, the periodicity determining portion 8f moves the process to step S309.

<Step S309>

Figure 9:
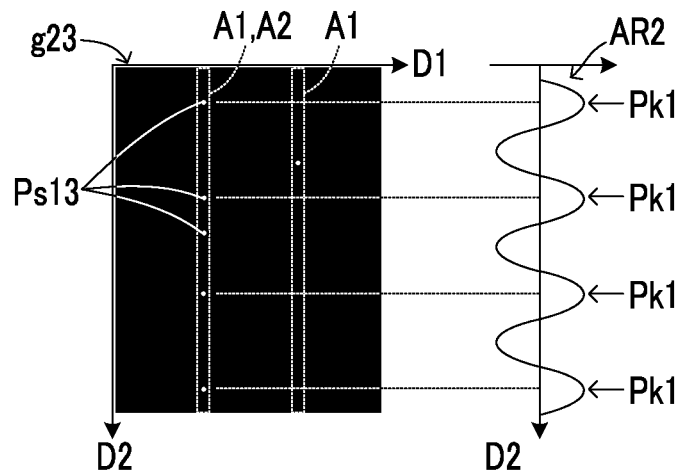
FIG. 9 is a diagram showing an example of the periodicity determination target image and an example of a pixel value distribution of secondary conversion data.

In step S309, the periodicity determining portion 8f converts the primary conversion correction data to a secondary conversion data AR2 of a space domain by applying an inverse Fourier transformation to the primary conversion correction data obtained in step S308 (see FIG. 9).

The secondary conversion data AR2 is obtained by removing information representing the non-periodic specific part from the vertical data sequence AR1. As a result, the position of the periodic specific part in the periodicity determination target image matches a peak position Pk1 in a waveform represented by the secondary conversion data AR2 (see FIG. 9).

On the other hand, the position of the non-periodic specific part in the periodicity determination target image is shifted from the peak position Pk1 in the waveform represented by the secondary conversion data AR2 (see FIG. 9).

After executing the process of step S309, the periodicity determining portion 8f moves the process to step S310.

<Step S310>

In step S310, the periodicity determining portion 8f classifies the specific part Ps1 in the periodicity determination target image into the periodic specific part or the non-periodic specific part. The specific part Ps1 in the periodicity determination target image is the horizontal stripe Ps12 or the noise point Ps13.

Specifically, the periodicity determining portion 8f classifies the specific part Ps1 into the periodic specific part or the non-periodic specific part by comparing the position of the specific part Ps1 in the sub scanning direction D2 with the peak position Pk1 in the waveform represented by the secondary conversion data AR2.

For example, when the position of a specific part Ps1 in the sub scanning direction D2 is within a predetermined approximate range of the peak position Pk1, the periodicity determining portion 8f classifies the specific part Ps1 into the periodic specific part. Otherwise, the periodicity determining portion 8f classifies the specific part Ps1 into the non-periodic specific part.

After executing the process of step S310, the periodicity determining portion 8f ends the periodic specific part determination process.

The execution, by the CPU 80, of the image defect determination process that includes the specific defect determination process is an example of an image processing method in which the state of the image defect is determined based on the test image g1 that is obtained through the image reading process performed on a sheet output from the image forming device 2.

The CPU 80 is configured to execute the image defect determination process to classify the noise point Ps13 and the horizontal stripe Ps12 that are different types of image defects, according to the causes thereof.

In addition, the determination of the causes of the image defects is performed individually on the three feature images g21, g22, and g23 that respectively include the specific parts Ps1 of different types. This makes it possible to determine the causes of the image defects with high accuracy by executing a relatively simple determination process.

Furthermore, it is possible to determine, with high accuracy, the cause of the horizontal stripe Ps12 or the noise point Ps13 that is generated due to a defect of any of the image creation rotating bodies.

In addition, the color vector identifying portion 8e identifies a color vector that represents a vector in a color space from one of a color of the specific part Ps1 in the test image g1 and a color of a reference area including the periphery of the specific part Ps1 to the other (see step S203 of FIG. 4).

In the cause determination process, the periodicity determining portion 8f in step S205 and the pattern recognizing portion 8g in step S206 determine the causes of the vertical stripe Ps11, the horizontal stripe Ps12, and the noise point Ps13 by further using the color vector. That is, the periodicity determining portion 8f and the pattern recognizing portion 8g determine, based on the color vector, which of a plurality of portions corresponding to the plurality of developing colors used in the image forming device 2, is the cause of the image defect.

In the image forming device 2 configured to print a color image, the use of the color vector makes it possible to determine easily and in a reliable manner which of a plurality of parts that correspond to the plurality of developing colors, is the cause of the image defect.

First Application Example

Figure 10:
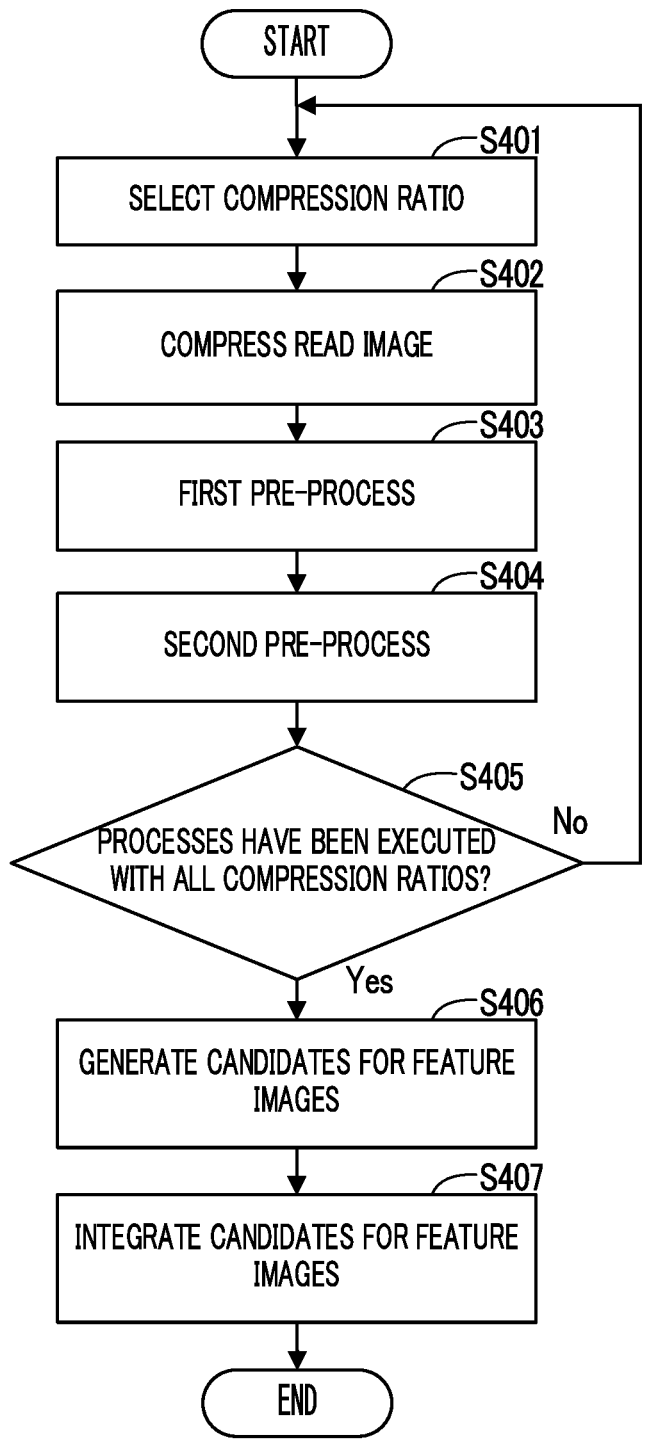
FIG. 10 is a flowchart showing an example of a procedure of a feature image generating process in a first application example of the image processing apparatus according to the embodiment.

Next, the following describes an example of a procedure of a feature image generating process according to a first application example of the image processing apparatus 10 with reference to the flowchart shown in FIG. 10.

In the following description, S401, S402, . . . are identification signs representing a plurality of steps of the feature image generating process of the present application example. The feature image generating process of the present application example starts from step S401.

<Step S401>

In step S401, the feature image generating portion 8c selects, from a plurality of predetermined compression ratio candidates, a compression ratio to be adopted and moves the process to step S402.

<Step S402>

In step S402, the feature image generating portion 8c generates the test image g1 by compressing the read image with the selected compression ratio. The processes of steps S401 and S402 are an example of a compression process. Thereafter, the feature image generating portion 8c moves the process to step S403.

<Step S403>

In step S403, the feature image generating portion 8c generates the first pre-process image g11 by executing the first pre-process on the compressed test image g1 obtained in step S401. Thereafter, the feature image generating portion 8c moves the process to step S404.

<Step S404>

In step S404, the feature image generating portion 8c generates the second pre-process image g12 by executing the second pre-process on the compressed test image g1 obtained in step S402. Thereafter, the feature image generating portion 8c moves the process to step S405.

<Step S405>

In step S405, upon determining that the processes of steps S401 to S404 have been executed with all of the plurality of compression ratio candidates, the feature image generating portion 8c moves the process to step S406. Otherwise, the feature image generating portion 8c executes the processes of steps S401 to S404 with a different compression ratio.

In the compression process of steps S401 and S402, the feature image generating portion 8c generates a plurality of test images g1 of different sizes by compressing the read image with a plurality of different compression ratios.

Furthermore, in steps S403 and S404, the feature image generating portion 8c generates a plurality of first pre-process images g11 and a plurality of second pre-process images g12 that respectively correspond to the plurality of test images g1 by executing the first pre-process and the second pre-process on the plurality of test images g1.

<Step S406>

In step S406, the feature image generating portion 8c executes the specific part extracting process on each of the plurality of first pre-process images g11 and the plurality of second pre-process images g12. This allows the feature image generating portion 8c to generate a plurality of candidates for each of the first feature image g21, the second feature image g22, and the third feature image g23 corresponding to the plurality of test images g1. Thereafter, the feature image generating portion 8c moves the process to step S407.

<Step S407>

In step S407, the feature image generating portion 8c generates the first feature image g21, the second feature image g22, and the third feature image g23 by integrating the plurality of candidates obtained in step S406. Thereafter, the feature image generating portion 8c ends the feature image generating process.

For example, the feature image generating portion 8c sets, as each pixel value of the first feature image g21, a representative value such as the maximum value or the average value of the pixel values of the plurality of candidates for the first feature image g21. This also applies to the second feature image g22 and the third feature image g23.

The processes of steps S401 to S404 are an example of a process to generate a plurality of first pre-process images g11 and a plurality of second pre-process images g12 by executing the first pre-process and the second pre-process multiple times with different size ratios of the size of the test image g1 to that of the focused area Ax1 and the adjacent areas Ax2. Changing the compression ratio is an example of changing the size ratio of the size of the test image g1 to that of the focused area Ax1 and the adjacent areas Ax2.

In addition, the processes of steps S406 to S407 are an example of a process to generate the first feature image g21, the second feature image g22, and the third feature image g23 by performing the specific part extracting process based on the plurality of first pre-process images g11 and the plurality of second pre-process images g12.

With the adoption of the present application example, it is possible to extract, without omission, the vertical stripes Ps11 or the horizontal stripes Ps12 of different thicknesses, or the noise points Ps13 of different sizes.

The first pre-process and the second pre-process in the present application example are an example of a process to generate a plurality of first pre-process images g11 and a plurality of second pre-process images g12 by executing the first pre-process and the second pre-process multiple times with different size ratios of the size of the test image g1 to that of the focused area Ax1 and the adjacent areas Ax2.

It is noted that the feature image generating portion 8c may generate a plurality of first pre-process images g11 and a plurality of second pre-process images g12 by executing the first pre-process and the second pre-process multiple times by changing a filter size.

The filter size is a size of the focused area Ax1 and the adjacent areas Ax2 in the first pre-process and the second pre-process. Changing the filter size is an example of changing the size ratio of the size of the test image g1 to that of the focused area Ax1 and the adjacent areas Ax2.

In addition, in the present application example, the feature image generating portion 8c may integrate the plurality of first pre-process images g11 into one and integrates the plurality of second pre-process images g12 into one.

For example, the feature image generating portion 8c sets, as each pixel value of the integrated first feature image g21, a representative value such as the maximum value or the average value of the pixel values of the plurality of first pre-process images g11. This also applies to the plurality of second pre-process images g12.

Furthermore, the feature image generating portion 8c may execute the specific part extracting process on the integrated first pre-process image g11 and the integrated second pre-process image g12. This generates the first feature image g21, the second feature image g22, and the third feature image g23.

Second Application Example

Next, the following describes the feature image generating process according to a second application example of the image processing apparatus 10.

In the present application example, the feature image generating portion 8c identifies, as the specific part Ps1, a part in which the pixel values of the first pre-process image g11 and the second pre-process image g12 are out of a predetermined reference range.

That is, in the present application example, the feature image generating portion 8c performs the specific part extracting process to identify the specific part Ps1 based on the size of each pixel value of the first pre-process image g11 and the second pre-process image g12. The process of the present application example performed by the feature image generating portion 8c is an example of a process to identify the specific part Ps1 composed of one or more significant pixels in the test image g1.

Furthermore, the feature image generating portion 8c extracts the vertical stripe Ps11 by removing, from the specific part Ps1 of the first pre-process image g11, the specific part Ps1 that is common to the first pre-process image g11 and the second pre-process image g12.

Furthermore, the feature image generating portion 8c extracts the horizontal stripe Ps12 by removing, from the specific part Ps1 of the second pre-process image g12, the specific part Ps1 that is common to the first pre-process image g11 and the second pre-process image g12.

Furthermore, the feature image generating portion 8c extracts, as the noise point Ps13, the specific part Ps1 that is common to the first pre-process image g11 and the second pre-process image g12.

For example, the feature image generating portion 8c generates the first feature image g21 by converting the first pixel value Xi that was not determined as the vertical stripe Ps11 in the first pre-process image g11, into an interpolation value based on the surrounding pixel values.

Similarly, the feature image generating portion 8c generates the second feature image g22 by converting the second pixel value Yi that was not determined as the horizontal stripe Ps12 in the second pre-process image g12, into an interpolation value based on the surrounding pixel values.

Similarly, the feature image generating portion 8c generates the third feature image g23 by converting the first pixel value Xi that was not determined as the noise point Ps13 in the first pre-process image g11, into an interpolation value based on the surrounding pixel values.

Alternatively, the feature image generating portion 8c may generate the third feature image g23 by converting the second pixel value Yi that was not determined as the noise point Ps13 in the second pre-process image g12, into an interpolation value based on the surrounding pixel values.

Third Application Example

The following describes the image defect determination process according to a third application example of the image processing apparatus 10.

In general, it may be difficult, depending on the density state of each color, for an image sensor to correctly detect a gradation level of a yellow part in an image that is a mixture of yellow and other colors. Similarly, it may be difficult, depending on the density state of each color, for an image sensor to correctly detect a gradation level of a chromatic color part in an image that is a mixture of black and chromatic colors.

In the present application example, the job control portion 8b performs the test print process to output two or three test output sheets 9 with different types of original test images g01 formed thereon.

In a case where three test output sheets 9 are output, a sheet on which an original mixed-color test image has been formed, a sheet on which an original yellow test image has been formed, and a sheet on which an original gray test image has been formed are output, wherein the original mixed-color test image is a combination of a uniform cyan single-color halftone image and a uniform magenta single-color halftone image, the original yellow test image is a uniform yellow single-color halftone image, and the original gray test image is a uniform black single-color halftone image.

In a case where two test output sheets 9 are output, a sheet on which a mixed-color test image has been formed and a sheet on which the original gray test image has been formed are output, wherein the mixed-color test image is a combination of a uniform cyan single-color halftone image, a uniform magenta single-color halftone image, and a uniform yellow single-color halftone image.

Accordingly, the test image g1 of the present application example includes the mixed-color test image, the yellow test image, and the gray test image that respectively correspond to the original mixed-color test image, the original yellow test image, and the original gray test image.

The yellow test image and the gray test image are each a halftone image of one developing color that is different from the colors mixed in the mixed-color test image. The yellow test image and the gray test image are each an example of a single-color test image.

In the present application example, the feature image generating portion 8c generates the first feature image g21, the second feature image g22, and the third feature image g23 for each of the mixed-color test images and the single-color test images read from a plurality of test output sheets 9.

Furthermore, in the present application example, the specific part identifying portion 8d identifies the positions of the specific parts Ps1 in the first feature image g21, the second feature image g22, and the third feature image g23 that respectively correspond to the mixed-color test images and the single-color test images. It is noted that the mixed-color test images and the single-color test images of the present application example are each an example of the target test image that is a particular target for identifying the specific part Ps1.

In the present application example, as is the case with the above-described embodiment, the color vector identifying portion 8e, the periodicity determining portion 8f, and the pattern recognizing portion 8g execute a process to determine the causes of the image defects, by using the first feature image g21, the second feature image g22, and the third feature image g23 corresponding to the mixed-color test images.

In the present application example, the periodicity determining portion 8f and the pattern recognizing portion 8g determine the cause of an image defect corresponding to the specific part in the mixed-color test image, from among a plurality of image creating portions 4x corresponding to a plurality of developing colors mixed in the mixed-color test image.

Furthermore, in the present application example, as is the case with the above-described embodiment, the periodicity determining portion 8f and the pattern recognizing portion 8g execute a process to determine the causes of the image defects, by using the first feature image g21, the second feature image g22, and the third feature image g23 corresponding to the single-color test images.

In the present application example, the periodicity determining portion 8f and the pattern recognizing portion 8g determine the cause of an image defect corresponding to the specific part in the single-color test image, from one of the plurality of image creating portions 4x that corresponds to the color of the single-color test image.

When the present application example is adopted, it is possible to determine the cause of the image defect based on the test output sheets 9 whose number is smaller than the total number of the developing colors used in the image forming device 2.

Fourth Application Example

The following describes the image defect determination process according to a fourth application example of the image processing apparatus 10.

In the present application example, the CPU 80 determines the cause of the specific part Ps1 by executing a process instead of the process executed by the pattern recognizing portion 8g.

For example, in the present application example, the CPU 80 determines the cause of the image defect by performing a classification based on one or more of: the number of the specific parts Ps1 in the first feature image g21, the second feature image g22, or the third feature image g23; thickness or aspect ratio of the specific part Ps1; and the pixel value level of the specific part Ps1.

Fifth Application Example

Next, the following describes the feature image generating process according to a fifth application example of the image processing apparatus 10.

In the present application example, the feature image generating portion 8c discriminates pixels constituting the specific part Ps1 from the other pixels by comparing the pixel values of the first pre-process image g11 and the second pre-process image g12 with a predetermined reference range.

That is, in the present application example, the feature image generating portion 8c performs the specific part extracting process to identify the specific part Ps1 based on the size of each pixel value of the first pre-process image g11 and the second pre-process image g12.

Furthermore, the feature image generating portion 8c extracts the vertical stripe Ps11 by removing, from the specific part Ps1 of the first pre-process image g11, the specific part Ps1 that is common to the first pre-process image g11 and the second pre-process image g12.

Furthermore, the feature image generating portion 8c extracts the horizontal stripe Ps12 by removing, from the specific part Ps1 of the second pre-process image g12, the specific part Ps1 that is common to the first pre-process image g11 and the second pre-process image g12.

Furthermore, the feature image generating portion 8c extracts, as the noise point Ps13, the specific part Ps1 that is common to the first pre-process image g11 and the second pre-process image g12.

For example, the feature image generating portion 8c generates the first feature image g21 by converting the first pixel value Xi that was not determined as the vertical stripe Ps11 in the first pre-process image g11, into an interpolation value based on the surrounding pixel values.

Similarly, the feature image generating portion 8c generates the second feature image g22 by converting the second pixel value Yi that was not determined as the horizontal stripe Ps12 in the second pre-process image g12, into an interpolation value based on the surrounding pixel values.

Similarly, the feature image generating portion 8c generates the third feature image g23 by converting the first pixel value Xi that was not determined as the noise point Ps13 in the first pre-process image g11, into an interpolation value based on the surrounding pixel values.

Alternatively, the feature image generating portion 8c may generate the third feature image g23 by converting the second pixel value Yi that was not determined as the noise point Ps13 in the second pre-process image g12, into an interpolation value based on the surrounding pixel values.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing method in which a processor determines a state of an image defect based on a test image that is obtained through an image reading process performed on an output sheet output from an image forming device, the image processing method comprising:
the processor generating an extraction image by extracting, from the test image, a target specific part that is a horizontal stripe extending in a horizontal direction or a noise point;
the processor deriving, from a target area in the extraction image in which three or more target specific parts are lined up in a vertical direction, a vertical data sequence composed of each representative value of a plurality of pixel values of each line extending in the horizontal direction in the target area;
the processor converting the vertical data sequence to primary conversion data of a frequency domain;
the processor determining whether or not the target specific parts have one or more predetermined periodicities in the vertical direction, based on the primary conversion data;
the processor converting, to secondary conversion data of a space domain, correction data that is obtained by removing, from the primary conversion data, data of frequency bands other than a particular frequency band corresponding to a target specific part that was determined as having the periodicities; and
the processor classifying the target specific parts included in the target area into periodic specific part and non-periodic specific part by comparing positions of the target specific parts in the target area with a peak position in a waveform represented by the secondary conversion data, the periodic specific part corresponding to the periodicities, the non-periodic specific part being specific part other than the periodic specific part.

2. The image processing method according to claim 1, wherein
the processor generating the extraction image includes:
generating a first pre-process image by executing a first pre-process using a horizontal direction of the test image as a predetermined processing direction, the first pre-process including a main filter process in which a pixel value of each of focused pixels sequentially selected from the test image is converted to a conversion value that is obtained by performing a process to emphasize a difference between a pixel value of a focused area including the focused pixels and a pixel value of two adjacent areas that are adjacent to the focused area from opposite sides in the processing direction;
generating a second pre-process image by executing a second pre-process that includes the main filter process in which a vertical direction of the test image is used as the processing direction; and
generating, as the extraction image, an image by extracting, as the noise point, a specific part that is common to the first pre-process image and the second pre-process image, from specific parts which are each composed of one or more significant pixels and are present in the first pre-process image and the second pre-process image.

3. The image processing method according to claim 2, wherein
the first pre-process includes:
generating first main map data by executing the main filter process using the horizontal direction as the processing direction;
generating horizontal edge strength map data by executing an edge emphasizing filter process on the focused area and one of the two adjacent areas on the test image, using the horizontal direction as the processing direction; and
generating the first pre-process image by correcting each pixel value of the first main map data by each corresponding pixel value of the horizontal edge strength map data, and
the second pre-process includes:
generating second main map data by executing the main filter process using the vertical direction as the processing direction;
generating vertical edge strength map data by executing the edge emphasizing filter process on the focused area and one of the two adjacent areas on the test image, using the vertical direction as the processing direction; and
generating the second pre-process image by correcting each pixel value of the second main map data by each corresponding pixel value of the vertical edge strength map data.

4. The image processing method according to claim 1, wherein
the processor generating the extraction image includes:
generating a first pre-process image by executing a first pre-process using a horizontal direction of the test image as a predetermined processing direction, the first pre-process including a main filter process in which a pixel value of each of focused pixels sequentially selected from the test image is converted to a conversion value that is obtained by performing a process to emphasize a difference between a pixel value of a focused area including the focused pixels and a pixel value of two adjacent areas that are adjacent to the focused area from opposite sides in the processing direction;
generating a second pre-process image by executing a second pre-process that includes the main filter process in which a vertical direction of the test image is used as the processing direction; and
generating, as the extraction image, an image by extracting, as the horizontal stripe, a specific part that is present in the second pre-process image and is not common to the first pre-process image and the second pre-process image, from specific parts which are each composed of one or more significant pixels and are present in the first pre-process image and the second pre-process image.

5. The image processing method according to claim 1, further comprising:
when the test image is a mixed-color test image that is a combination of a plurality of single-color halftone images corresponding to the plurality of developing colors,
the processor identifying a color vector that represents a vector in a color space from one of a color of the target specific part in the mixed-color test image and a color of a reference area including a periphery of the target specific part to the other; and
the processor determining, based on the color vector, which of a plurality of image creating portions of the image forming device corresponding to the plurality of developing colors, is the cause of the target specific part.

6. An image processing apparatus comprising the processor that executes processes of the image processing method according to claim 1.

\* \* \* \* \*